(12) United States Patent
Wiedeman et al.

(10) Patent No.: US 6,985,454 B1
(45) Date of Patent: Jan. 10, 2006

(54) ISP SYSTEM USING NON-GEOSYNCHRONOUS ORBIT SATELLITES

(75) Inventors: Robert A. Wiedeman, San Jose, CA (US); Prashant V. Waknis, Mountain View, CA (US)

(73) Assignee: Globalstar L.P., San Jose, CA (US)

( * ) Notice: Subject to any disclaimer, the term of this patent is extended or adjusted under 35 U.S.C. 154(b) by 445 days.

(21) Appl. No.: 09/334,386

(22) Filed: Jun. 16, 1999

Related U.S. Application Data

(60) Provisional application No. 60/117,284, filed on Jan. 26, 1999.

(51) Int. Cl.
H04B 7/185 (2006.01)

(52) U.S. Cl. ............ 370/316; 370/390; 370/394; 370/401

(58) Field of Classification Search ........... 370/310, 370/311, 312–316, 390, 394, 401, 406, 400, 370/402, 403, 404
See application file for complete search history.

(56) References Cited

U.S. PATENT DOCUMENTS

| | | | |
|---|---|---|---|
| 5,151,899 A | | 9/1992 | Thomas et al. ............ 370/394 |
| 5,410,728 A | | 4/1995 | Bertiger et al. ............ 455/13.1 |
| 5,452,471 A | * | 9/1995 | Leopold et al. ............ 455/429 |
| 5,610,595 A | | 3/1997 | Garrabrant et al. .... 340/825.52 |
| 5,736,959 A | | 4/1998 | Patterson et al. ........... 342/354 |
| 5,740,164 A | | 4/1998 | Liron ........................ 370/316 |
| 5,796,715 A | | 8/1998 | Patterson et al. ........... 370/349 |
| 5,959,984 A | * | 9/1999 | Dent .......................... 370/347 |
| 6,067,442 A | * | 5/2000 | Wiedeman et al. ........ 455/13.1 |
| 6,097,752 A | * | 8/2000 | Wiedeman et al. ......... 375/130 |
| 6,134,423 A | * | 10/2000 | Wiedeman et al. ......... 455/117 |
| 6,215,776 B1 | * | 4/2001 | Chao .......................... 370/316 |
| 6,415,329 B1 | * | 7/2002 | Gelman et al. ............. 709/245 |

FOREIGN PATENT DOCUMENTS

WO WO 98/16046 4/1998

OTHER PUBLICATIONS

European Search Report dated Sep. 3, 2001, from corresponding European Patent Application No. 00300535.

* cited by examiner

Primary Examiner—Chau Nguyen
Assistant Examiner—Melanie Jagannathan
(74) Attorney, Agent, or Firm—Karambelas & Associates

(57) ABSTRACT

A satellite communication system includes a plurality of satellites, such as low earth orbit satellites, and a plurality of gateways. The satellite communication system is bidirectionally coupled to a terrestrial communication system through at least the plurality of gateways. The satellite communication system and the terrestrial communications system together form a data communication network having a plurality of nodes including source nodes, destination nodes and intermediate nodes. Multiple copies of a packet can coexist within the data communication network, and the packet and its one or more copies are routed, using at least in part satellite-resident routers and gateway-resident routers, over a plurality of different paths between a particular source node and a particular destination node. At least one duplicate copy of a given packet is simply not used during the execution of a packet reordering procedure in the destination node, or at an intermediate node. Certain of the paths are carried over satellite-to-satellite cross-links, while certain other ones of the paths are carried over satellite-to-gateway uplinks and downlinks, and at least one path exists between a user terminal and at least one satellite. In a preferred embodiment the packets are TCP/IP (or equivalent protocol) packets containing information for enabling the selective destruction of a duplicate packet to occur.

31 Claims, 20 Drawing Sheets

ISP SYSTEM USING NON-GEOSYNCHRONOUS ORBIT SATELLITES

CLAIM OF PRIORITY FROM A COPENDING PROVISIONAL PATENT APPLICATION

Priority is herewith claimed under 35 U.S.C. §119(e) from copending Provisional Patent Application 60/117,284, filed Jan. 26, 1999, entitled "ISP SYSTEM USING NON-GEO-SYNCHRONOUS ORBIT SATELLITES", by Robert A. Wiedeman. The disclosure of this Provisional Patent Application is incorporated by reference herein in its entirety, insofar as it does not conflict with the content of this patent application.

FIELD OF THE INVENTION

This invention relates generally to data communications networks and systems, such as the Internet, and more particularly to satellite-based communications systems capable of supporting data communications network traffic.

BACKGROUND OF THE INVENTION

The Internet has had an explosive impact on the telecommunications businesses of the world in the recent past, and a need has developed for worldwide access for Internet Services. However, many potential users cannot gain access to the Internet due to lack of telecommunications in rural and wilderness areas. Low Earth Orbit (LEO) mobile satellite systems (LEO-MSS) are now in the early stages of introduction. However, the data rates offered by these systems are typically below 9600 Bps and are therefore are not suited for an Internet application which typically requires speeds of at least 56000 Bps or higher.

In the past LEO-MSS systems have developed around connection oriented systems, modeled after the telephone system. Conventionally, to communicate to someone a number is dialed and a connection is established through a number of switches, after which communications is passed via that dedicated connection path, until that traffic is finished, after which the connection is released. The essential aspect of a connection is that it acts like a tube: i.e., the sender places objects (bits) into one end, and the receiver takes them out of the other end. The IRIDIUM™ system acts in this manner, with the switching system in space for defining a route via from one to many satellites from a user to a dedicated downlink, from a specified satellite to a specified gateway, the specification of which depends on the sender's selection of destination as indicated by a number that is dialed.

In contrast, a connection-less service is modeled after the postal system. Each message carries the full source and destination address, and each one is routed through the system independent of all the others. Normally, when two messages are sent to the same destination, the first one sent will be the first one to arrive. However, it is possible that the first one sent will be delayed such that the second one arrives first. With a connection oriented service this is impossible.

It should be noted that not all applications require connections, and services and protocols are distinct concepts. In general a service is a set of operations that a network layer (a layer is the organization of a network) performs, wherein one computer (or machine) carries on a conversation with another computer (or machine), and may provide input to another layer above it. The service defines what operations the layer is prepared to perform on behalf of its users. A protocol, in contrast, is a set of rules governing the format and meaning of the frames, packets, or messages exchanged by peer entities within a layer. For example, the OSI (Open Systems Interconnection) model has seven layers, a Physical Layer (Layer 1) consisting of the physical equipment, and a Data Link Layer (Layer 2) which breaks the input data into data frames which are transmitted sequentially and processes any acknowledgement frames sent back by the receiver. In addition, there is a Network Layer (Layer 3), which determines how packets are routed from source to destination, which controls congestion due to too many packets, and in some cases accounts for how many packets or bits are sent. There is also a Transport Layer (Layer 4) which accepts data from a Session Layer (described next), splits it up into smaller units if needed, passes them to the network layer, and decides on what type of service to provide the session layer, including multiplexing several message streams onto one channel. In addition the Transport Layer takes care of establishing and deleting connections across the network, and provides flow control. The Session Layer (Layer 5) allows users on different machines (computers) to establish sessions between them. A session allows data transport and provides enhanced services useful in some applications, such as remote login to a remote time-sharing system or to transfer a file between two machines. The Session Layer can provide token management if necessary, and synchronization services for file transfer. The Presentation Layer (Layer 6) performs and enables functions of a general nature that are often requested, such as encoding data in a standard method. The Application Layer (Layer 7) contains a variety of protocols that are commonly needed due to incompatible hardware or software.

The widespread use of TCP/IP as the protocol used to connect multiple networks together has employed the above described OSI model. The requirements of the packet network called the "Internet" led to a connection-less internetwork layer referred to as the Internet Layer, equivalent to the "Network Layer" of the OSI model, wherein the function of the layer is to deliver IP (the official packet format and protocol of this layer) packets where they are intended to go. The Presentation and Session Layers are generally not present in the TCP/IP model. The Transport layer is present in the TCP/IP model and has two end-to-end protocols defined. The first one is the TCP (Transmission Control Protocol) which provides a byte stream originating on one machine to be delivered without error on another in the Internet. The TCP fragments the incoming byte stream into discrete messages and passes each one onto the Internet Layer. At the destination the receiving TCP process reassembles the received messages into the output stream. The TCP also handles flow control to ensure that a fast sender cannot swamp a slow receiver with more messages than it can handle. The second protocol is known as UDP (User Datagram Protocol), which is an unreliable single shot protocol used for applications that do not want sequencing or flow control.

The Application Layer is included in the TCP/IP model and contains all the higher level protocols such as TELNET, electronic mail (SMTP), Domain Name Service (DNS), Hyper Text (HTTP), which is a protocol useful for fetching pages on the World Wide Web (WWW), and many others. The use of TCP/IP is optimized for the Internet and connection-less systems.

The end delivery of messages utilizing TCP/IP can be over a connection system such as one shown in FIG. 1A. In this example, a connection is made from the user to a satellite, which is switched according to a route or path to another satellite with a switching unit, which in turn can switch the connection to another satellite or to a gateway. The gateway in turn is connected by a switch to an Internet Service Provider (ISP) which provides a connection to the Internet via a router. This router, acting on information in the traffic packets provided to it, then routes the packets via the Internet to a host router and thence to a host server where the packets are delivered.

Many previously proposed LEO-MSS systems have been connection-based systems. GLOBALSTAR™ is a satellite system which is switch based, with the switch being located in the gateway. IRIDIUM™ is a satellite system which is switch based, with the switch being located in the satellite. The IRIDIUM™ system uses satellite-to-satellite switched links to establish a connection between a user and another user, or a user and a telephone connected to the Public Switched Telephone System. This is made clear in U.S. Pat. No. 5,410,728, which defines a communication system that includes satellite switches in space, where the satellite switches route the call through the appropriate satellites. The optimum path for the communications is determined by each satellite from itself to the next appropriate satellite. The data or voice is received on a Frequency Division Multiplexed (FDM) basis, demodulated, and then (in the satellite) packetized. The Inter-Satellite Links (ISLs) provide various paths that can be chosen by the satellites to use, however, only one single path is chosen. The paths are chosen by the satellite based on the office code portion of the telephone number of the called user, and a single path is developed based on the telephone number, as the call is "cross-linked" from one satellite to another.

Typically a connection based system utilizes the Public Switched Telephone Network (PSTN) based on various relay technologies. The early versions of the PSTN used analog techniques. Later the Frame Relay added services which provided a bare-bones connection-oriented way to move bits from point A to point B at reasonable speeds. Frame Relay can be best thought of as a virtual leased line. The difference between a leased line and a virtual leased line is that users can lease virtual circuits between two points and send packets of up to 1600 bytes between them. The Frame Relay provides a way to determine the start and end of each frame, but does not provide acknowledgements or flow control. Alternatively, the broadband integrated services digital network (typically referred to as B-ISDN) may be used. B-ISDN employs an Asynchronous Transfer Mode (ATM) which transmits all information in small, fixed-size packets referred to as cells, each of which is 53 bytes in length. ATM uses cell switching technology, and is a clear break with traditional circuit switching. ATM networks are connection oriented, and making a call requires first sending a message to set up the connection.

In any case, from the point of view of the PSTN the system is divided into two parts, i.e., local loops and trunks. A local loop may be a local exchange which includes a home telephone, or it may be a cellular telephone system, or a mobile satellite system gateway to the user. Generally, it connects a user's device to a switch of some sort. In the case of satellite mobile systems the user is connected to a mobile telephone switching office (an MTSO), also called a MSC (mobile switching center), via a satellite. The satellite may or may not have on-board switching as described above.

Alternatively, a connection less system or packet switched system is not necessarily connected through the PSTN, but may use portions of it for the transport of traffic packets. Typically, the user encodes the packets with TCP/IP information and transmits the packets into the Internet via a router. A router, which is considerably different in architecture than a circuit switch, operates on the network layer of OSI (called the Internet layer of TCP/IP) to deliver packets from the source to the destination. The IP protocols in a connection less system or packet switched system therefore, are imposed on each packet, wherein each packet carries the full destination address. This is because each packet sent is carried independently of its predecessors, if any. This is clearly the opposite of a circuit-switched system, wherein packets are not necessarily identified, nor do they need to be, since the path between the two ends of the transmission circuit do not vary (while virtual circuits may be setup as in frame relay or ATM they are essentially fixed with respect to the user, and do not require that the user encode his packets with any information as to routing).

In the case of the IRIDIUM™ system described above the user dials a number, and that number is used within the satellite to define a path. The user need not packetize his transmission, since that will be accomplished in the satellite. A difference between a connection based system and a connection-less system is thus whether or not a call set up is required. In the case of a connection based system a call setup is required, while it is not required for a connection-less system.

There exist today two examples of the two types of telecommunications systems in common usage. The Internet represents a connection-less based system while the PSTN, with its ATM networks, represents a connection based system. The Internet can work over the PSTN's ATM network by having the source host first establish an ATM network layer connection to the destination host, and by then sending independent IP packets over it. However, the typical PSTN services of telephony in general cannot be sent over the Internet directly.

In a connection-less system, successive packets may follow different routes. The independent packets of the connection-less system are called datagrams. For the case of datagram usage, routers have a table describing which output port to use for each possible destination router. In contrast, connection-based switches which setup virtual or real circuits maintain a table with one entry per open virtual (or real) circuit passing through it. Each packet traveling through the network must contain a virtual circuit number field in its header, in addition to sequence numbers, checksums and the like. Returning now to the datagram in a connection-less system, when a packet arrives the router looks up in the table the output port to use and sends the packet on its way. The establishment and release of transport layer connections does not require any special work on the part of the routers. Various routing algorithms are used to route packets from the source machine to the destination machine. In most networks, packets will require multiple hops to make the journey. The routing algorithm that is part of the network layer software is responsible for deciding which output port an incoming packet should be transmitted on. The internal decisions on routing are made anew for every arriving packet, since the best route may have changed since the last arrival of the last packet. The routing algorithms are designed for correctness, simplicity, robustness, stability, fairness, and optimality. Routing algorithms may be Non-adaptive or Adaptive. Non-adaptive algorithms do not base their decisions on measurements or estimates of current traffic or topology, while Adaptive reflect changes and are dynamic.

At the network layer, the Internet can be viewed as a collection of sub-networks that are connected together.

There is no real structure, but many backbone networks, high bandwidth lines, and fast routers. Attached to the backbones are regional, national and commercial networks, and attached to these networks are various Local Area Networks (LANs) at many universities, companies, and Internet Service Providers (ISPs). FIG. 2 shows this quasi-hierarchical organization. The enabling protocol that holds the Internet together is the network layer protocol referred to as the IP (Internet Protocol).

Communication in the Internet works as follows. The Transport Layer takes data streams and breaks them up into datagrams. In theory, datagrams can be up to 64 Kbytes in length, but are typically only about 1.5 Kbytes in length. Each datagram is transmitted through the Internet, and may be fragmented into smaller units as it goes. When all the pieces finally arrive at the destination machine they are reassembled by the Network Layer into the original datagram. This datagram is then handed to the Transport Layer, which inserts it into the receiving process's input stream. Every host and router on the Internet has a 32-bit IP address, which encodes its network number and host number, the combination for each host and router being unique. A user on one network can send a packet to a user on another network by using this address. Not to be confused as a telephone number, which is used to set up a call over a specific route and to provide billing information, the IP address is instead analogous to that of a mail box, wherein each message is provided the address, with the actual route of delivery being optional.

The system operates in the following manner. The user wanting to send a packet first determines the IP address of the destination. This is accomplished by using a system known as the Domain Name System (DNS). The upper layer software on the user's machine builds a packet with the IP address for the receiving machine, and gives it to the IP software to transmit. In general, the host network then outputs a broadcast message requesting who owns that address. When the receiving machine is local, it responds with an Address Resolution Protocol (ARP) reply to the ARP request by the sending machine. The ARP reply contains the physical address of the receiving machine. At this point, the IP software builds a frame addressed to the receiving machine, puts the IP packet in the payload field, and places the frame onto the network. The receiving machine reads the frame, and the software on the receiving machine then extracts the IP packet from the frame, and passes it to the IP software, where it determines if is properly addressed, and processes it to extract the message. Various optimizations of ARP and mapping of networks have been derived, however, this simple method serves as an adequate illustration. Sending packets from the user to very distant networks is similar, except that the router's lookup tables tell it to use a Wide Area Network (WAN) Router, and it chooses to route the packet onto a network other than the local one.

As should be evident, the routers perform the task of moving packets through the network. There are, at this time, four classes of routers; Internal Routers (wholly within one area), Area Border Routers (which connect two or more areas), Backbone Routers (on the backbone), and Autonomous System Routers (for communicating between other autonomous systems). These classes overlap, with border routers automatically being part of the backbone, etc. These routers exchange information with one another during normal operation. These messages allow the routers to discover who its neighbors are, provide the sender's costs to its neighbors, acknowledge link states, announce updates, and request information from neighbor routers. Packets are transmitted over these networks, with various routers operating on each packet to determine its path to the destination. Since following packets, with the same address, may be passed through different routers depending on various factors, such as traffic loading, availability, etc., it may be possible that the following packets arrive earlier than the previous ones. The software at the network layer then rearranges these packets into the correct order. This situation, as discussed before, is not possible with the connection-oriented system utilizing switches, as each packet would follow the preceding packet from end of the connection to the other.

A different type of satellite-based telecommunications system is described in, for example, U.S. Pat. No. 5,736,959, "Earth-Fixed Cell Beam Management for Satellite Communication System Using Dielectric Lens-Focussed Scanning Beam Antennas", by Patterson et al.; U.S. Pat. No. 5,740,164, "Traffic Routing for Satellite Communication System", by Liron; and U.S. Pat. No. 5,796,715, "Non-Blocking Dynamic Fast Packet Switch for Satellite Communication Systems", by Patterson et al. This system employs datagram switching with cross-linked satellites and satellites that contain packet switches, wherein at each node of the system delay vectors are calculated to estimate a time delay that a given packet will experience along various paths, and the packet is routed to the destination via the pathway that insures both the lowest end-to-end delay and the best overall traffic management of the network. The routing algorithm is said to be an adaptive dynamic distributed routing algorithm where packets are switched through the network in a store and forward fashion. Both satellites and gateways may possess routing capabilities. Based on position information relating to neighboring satellites and expected delay information, an adaptive routing processor selects the 'best' pathway from a particular satellite to a single neighboring satellite, and the packet is then moved through internal switch circuitry on the satellite to the next satellite.

OBJECTS AND ADVANTAGES OF THE INVENTION

It is a first object and advantage of this invention to provide an improved satellite based communication system for routing packet traffic between ground stations and satellites, as well as between satellites.

It is another object and advantage of this invention to provide an improved satellite based communication system for routing packet traffic between ground stations and satellites, as well as between satellites, wherein the generation and routing of duplicate packets enables a significant reduction in the complexity of the routing algorithm.

It is another object and advantage of this invention to provide a technique to extend the Internet with satellites, thereby enabling remote users to access the Internet.

It is a further object and advantage of this invention to provide a satellite communication system wherein multiple copies of a packet can coexist within the system, and be routed over a plurality of different paths between a source node and a destination node, and wherein a duplicate copy or copies of a given packet can be selectively destroyed during the execution of a packet reordering procedure in the destination node, or at any intermediate node within the system.

It is another object and advantage of this invention to provide a satellite communication system wherein multiple copies of a packet are injected into and extracted from a terrestrial communication network, such as the Internet, using a plurality of gateways.

It is yet another object and advantage of this invention to provide a satellite communication system wherein multiple copies of a packet are generated and routed over different paths, thereby alleviating the delays that occur when a particular packet on a particular path is corrupted and must be retransmitted.

SUMMARY OF THE INVENTION

The foregoing and other problems are overcome and the objects and advantages are realized by methods and apparatus in accordance with embodiments of this invention.

In one aspect this invention solves the foregoing problems by integrating an Internet Access Point (IAP) directly into a satellite. Since the Internet uses a protocol known as TCP/IP (Transmission Control Protocol/Internet Protocol) as its transport mechanism, and since minimizing the delay of packet data is important, this invention provides a low delay, global transport mechanism to optimize satellite delivery of Internet Services (IS).

A method in accordance with this invention, and apparatus that operates in accordance with the method, routes multiple copies of a given packet between a source node and a destination node using a plurality of satellites and at least one gateway.

This invention provides a satellite communication system that includes a plurality of satellites, such as low earth orbit satellites, and a plurality of gateways. The satellite communication system is bidirectionally coupled to a terrestrial communication system through at least the plurality of gateways. The satellite communication system and the terrestrial communications system together form a data communication network having a plurality of nodes including source nodes, destination nodes and intermediate nodes. Multiple copies of a packet can coexist within the data communication network and the packet and its one or more copies are routed, using at least in part satellite-resident routers and gateway-resident routers, over a plurality of different paths between a particular source node and a particular destination node. At least one duplicate copy of a given packet is simply ignored during the execution of a packet reordering procedure in the destination node. Certain of the paths are carried over satellite-to-satellite cross-links, while certain other ones of the paths are carried over satellite-to-gateway uplinks and downlinks, and at least one path exists between a user terminal and at least one satellite.

In a preferred embodiment the packets are TCP/IP (or equivalent protocol) packets containing information for enabling the selective destruction of a duplicate packet to occur.

The plurality of gateways couple the satellite communication system to the terrestrial communication system at a plurality of points, including at least at one of regional networks, national networks, commercial networks, Internet Service Providers (ISPs), or directly to a backbone network.

In accordance with a method of this invention for packet data transmission through a data communications system comprising satellite routers and terrestrial routers, the following steps are executed: originating a stream of packets at a source node; selectively duplicating individual ones of the stream of packets and operating the satellite routers to route duplicate packets over different paths, including wireless paths through a medium subject to transmission impairments; and reconstructing the stream of packets from received packets while ignoring an arrival of an already received and valid packet.

The step of selectively duplicating is performed in at least one satellite router in response to at least one criterion. The at least one criterion can be one of a measure of the quality of the medium; whether the packet was previously duplicated; a number of remaining hops from the satellite router to a destination node; a current available bandwidth; a user service agreement; a direction of transmission, from source to destination or from destination to source; and whether multicasting is desired.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

By way of introduction, and in opposition to the prior art connection oriented system to and from the Internet Service Provider (ISP) that was described above, this invention utilizes satellites with routers to extend the edge of the Internet to the user. In the connection-less Internet access system shown in FIG. 1B there exists a plurality of nodes. A node may be a source node, a destination node, or an intermediate node. A given user or user terminal 7 may be either a source node or a destination node, while a gateway 5 may typically be an intermediate node, as would be individual ones of the satellites 3.

Figure 1A:
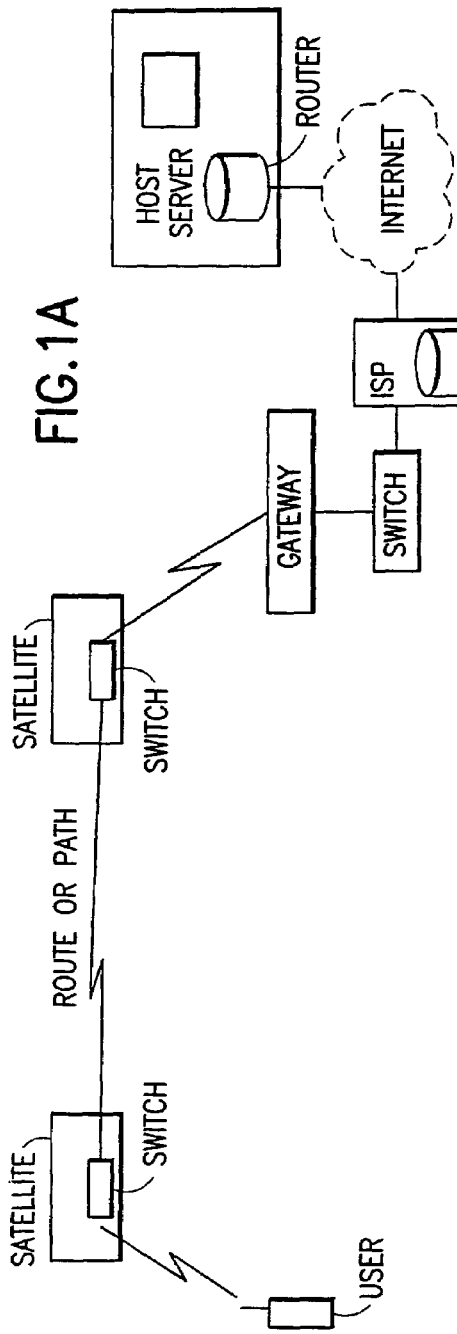
FIG. 1A is simplified block diagram of conventional connection based Internet access satellite communication system.
Figure 1B:
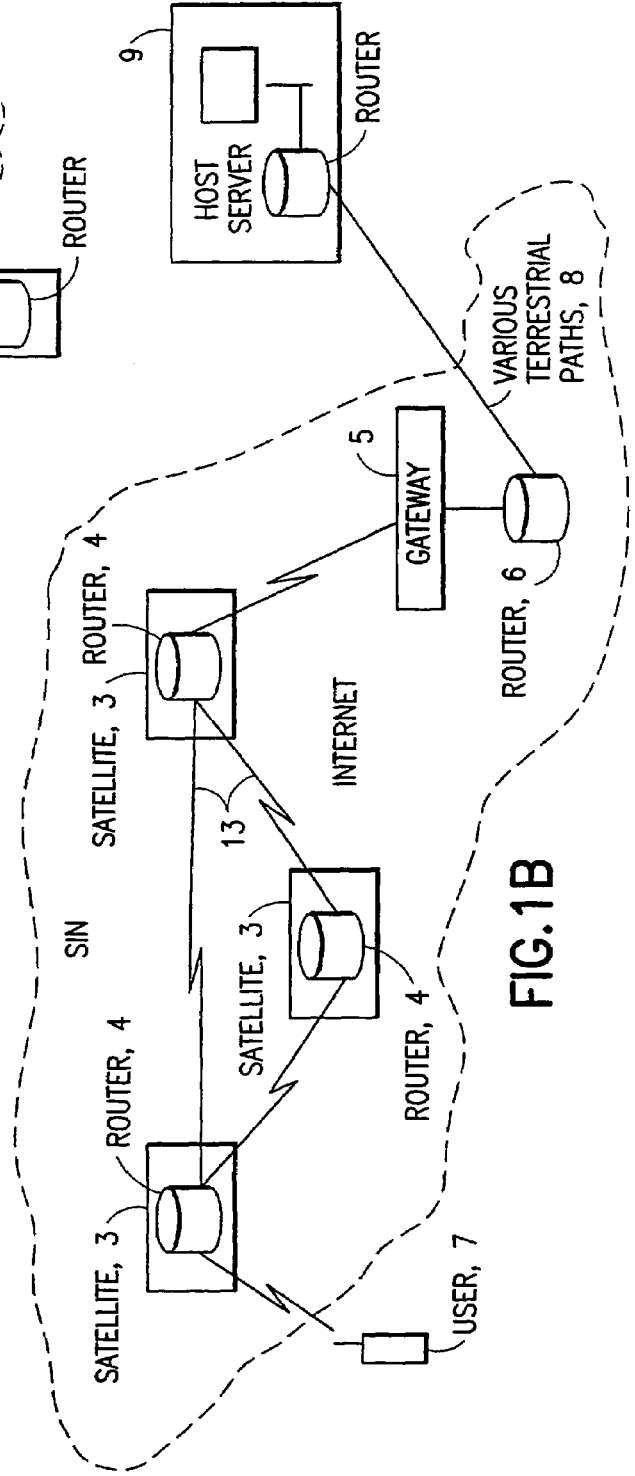
FIG. 1B is a simplified block diagram of connection-less based Internet access satellite communication system in accordance with an embodiment of this invention.
Figure 2:
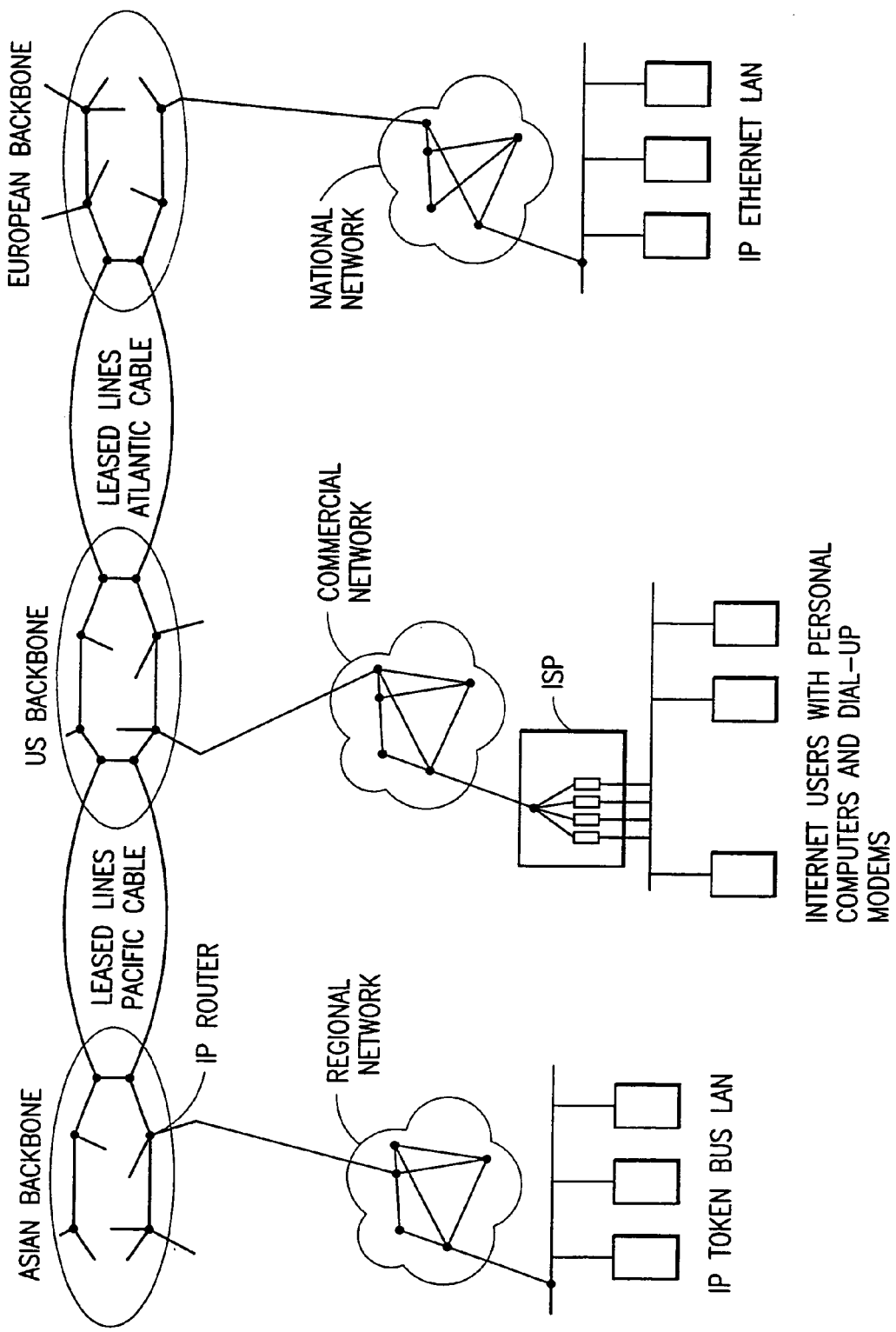
FIG. 2 is a simplified network diagram of the conventional Internet.

In FIG. 1b a user 7 establishes a connection to one or more satellites 3, each having a satellite router 4, for exchanging TCP/IP information. TCP/IP is connection-oriented protocol. The packets of TCP/IP information are routed over a Satellite Internet Network (SIN) through inter-satellite links (cross-links) 13 to a ground service introduction point (GSIP), such as a gateway 5, which includes a gateway router 6. The packets of TCP/IP information are then introduced into the Terrestrial Internet Network (TIN) 8 and flow therein in a normal manner.

Figure 3:
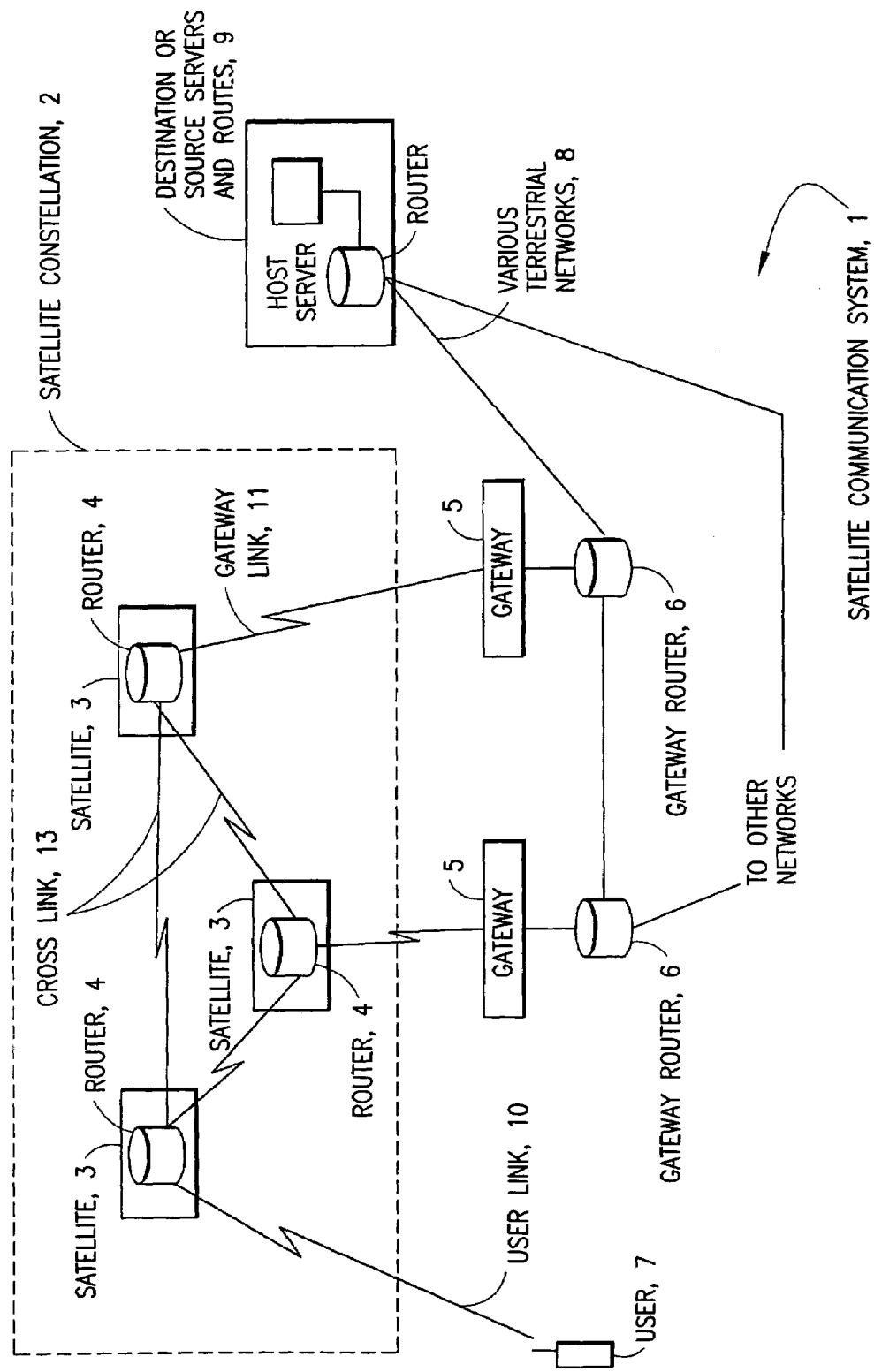
FIG. 3 depicts an embodiment of a connection-less satellite Internet access system in accordance with an embodiment of this invention.

A more detailed diagram of the Satellite-based Connectionless Internet Access (CLIA) system of this invention is shown in FIG. 3. A satellite communication system 1 has a constellation 2 of satellites 3, each of which incorporates a router 4. A user 7 can bidirectionally couple to the constellation 2 or to an individual satellite 3 with a wireless communication link 10. The routers 4 are interconnected within the constellation 2, allowing independent and multiple links or paths for packets sent or received by the user 7. The satellites 3 are also bi-directionally coupled with links 11 to gateways 5 (two of which are shown for convenience). The gateways 5 may each include a gateway router 6 which is connected to various terrestrial networks 8. The gateway routers 6 may be connected to each other for interconnecting system users 7, or via the other various terrestrial networks 8 to destination or source routers, and host servers 9. An important purpose of the system 1 is to send data packets to and receive data packets from the users 7. In a most preferred embodiment of this invention the packets are TCP/IP packets, although in other embodiments the packets may conform to some other standard or protocol.

Figure 4A:
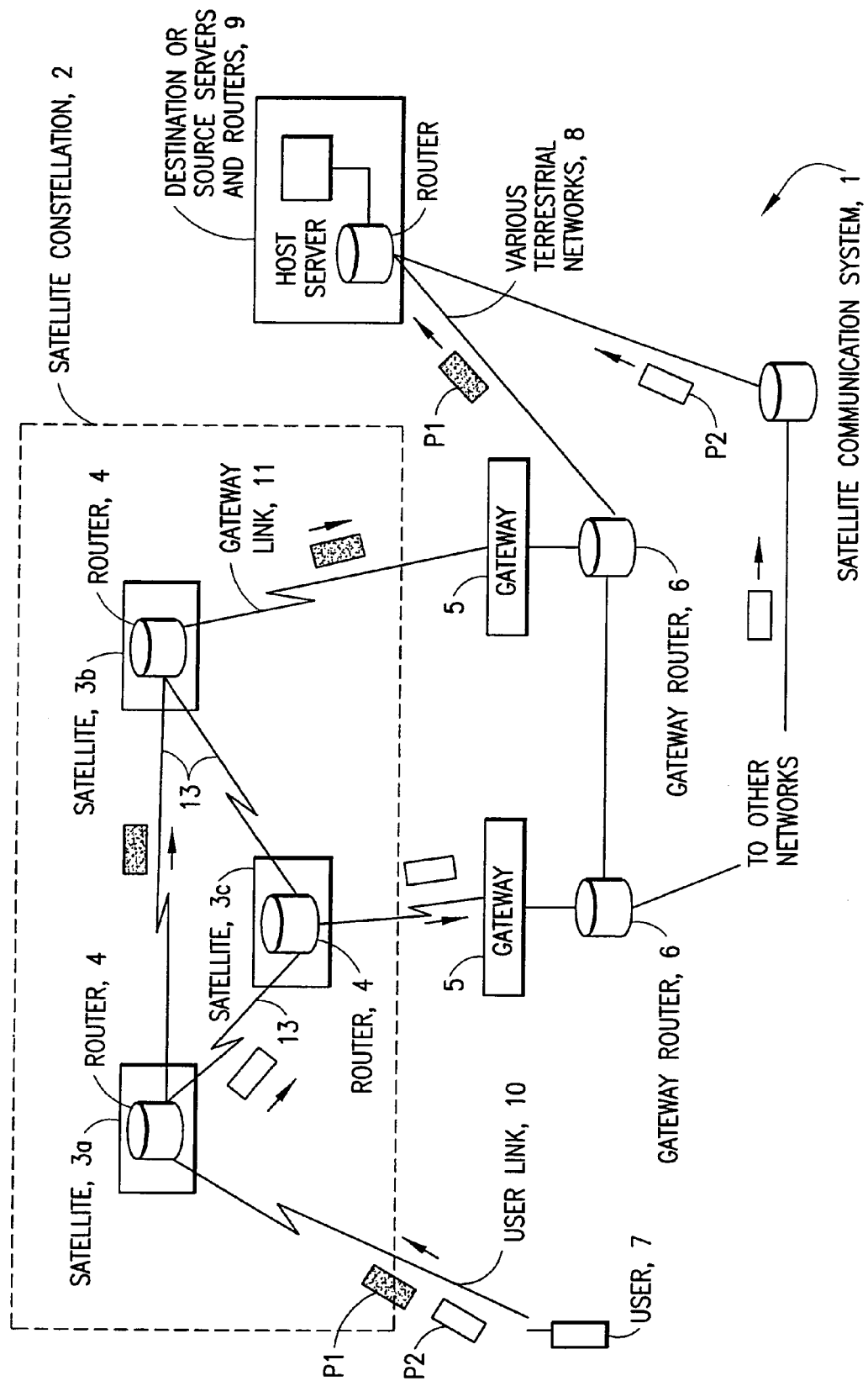
FIG. 4A is related to FIG. 3, and illustrates the operation of sending packets from a user to a host in a first embodiment.

A user 7 sending two consecutive packets of data through the system 1 to a host server 9 is shown in FIG. 4A. The packets are formed in the user terminal 7 and are sent via the user link 10 to the constellation of satellites 2. For a simple example, first consider reception by a single satellite 3a of packets formed and sent by user 7. The satellite 3a receives the packets P1 and P2 sequentially, and provides them to its router 4. The router 4, when operating on the packet received first, calculates an optimal path depending on the routing algorithm used. In one example it determines that, at that instant, satellite 3b will receive the packet P1, and the router 4 in satellite 3a puts it on the cross-link 13 to that satellite, and sends it on its way. Then when operating on the packet P2 the router 4 of satellite 3a determines that, at that instant, satellite 3c is optimum for transmitting the packet, and router 4 puts it on the cross-link 13 to that satellite. While it is possible that sequential packets may be sent to the same satellite, it is not necessary, and the path is chosen independently for each packet depending on the state of the information of the router 4 in satellite 3a. In any case, packet P1 is received by satellite 3b and operated on by its router 4. This router determines if it should be sent on to another router in another satellite or sent to a ground node gateway 5. Assuming that the determination of the router 4 in satellite 3b is that it should be sent to a gateway 5, it puts it on the gateway link 11 to the gateway 5 and transmits it to the ground where it is received by the gateway and sent to the gateway router 6. The gateway router 6 then operates on the packet P1 and places it on the network 8 for delivery to the destination router 9 and eventual delivery to the host server. In a similar manner, packet P2 is processed by various satellite, gateway, and terrestrial network routers, which enable the packet P2 to arrive at the destination router 9. The network layer and transport layer software at the destination router 9 then reassembles the IP fragments, puts the packets in their proper order, and delivers them to the server application.

Figure 4B:
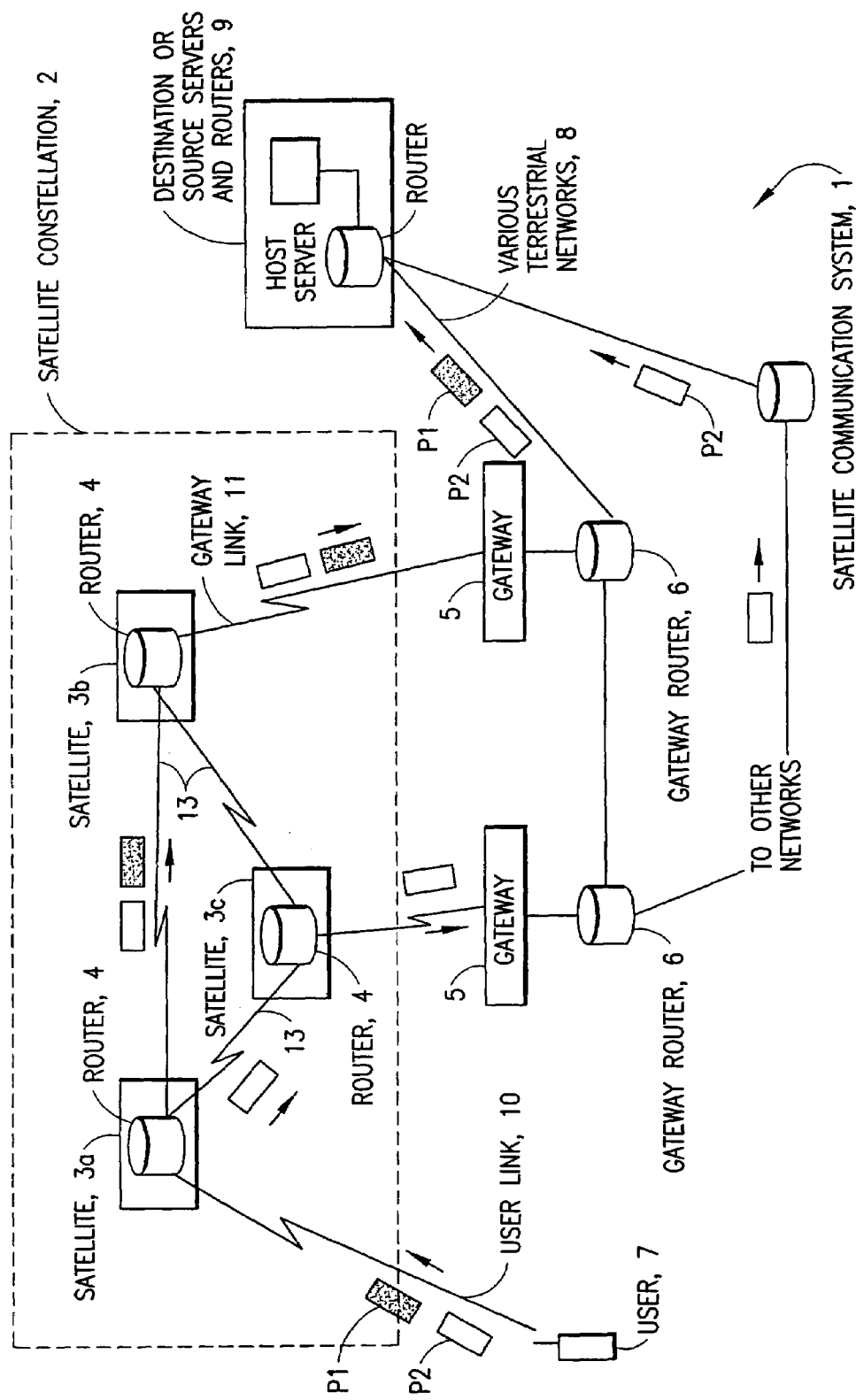
FIG. 4B illustrates the operation of sending packets from the user to the host in a second embodiment of this invention, wherein the same packet is sent from one node to two or more connected nodes.

FIG. 4B shows an embodiment wherein satellite 3a has elected to send packet P1 to satellite 3b, but to send packet P2 to both satellites 3a and 3b. In this embodiment multiple copies of the same packet can coexist within the system 1, and can arrive at different times at the final destination. In this case the normal TCP/IP packet handling procedures are responsible for detecting the presence of multiple copies of packets, and for deleting the unnecessary (duplicate) copies. This embodiment of the invention may be considered to be similar to or a variant of flood routing, or to be a modified flood routing technique. The decision to route duplicate copies of a given packet over two or more paths can be made on a packet-by-packet basis, based on system considerations, or can be done automatically for all packets. By example, every packet arriving at satellite 3b may be automatically routed to every neighbor satellite (e.g., satellites 3b and 3c), and the same can be done at satellite 3b and satellite 3c. Automatically downlinking a packet to any available gateway 5 may be done as well, in addition to routing the packet via cross-links 13 to other satellites. Alternatively, if a given packet is downlinked to a gateway 5, then additional copies of that packet may not be further transmitted via cross-links 13 to other satellites 3.

Figure 5A:
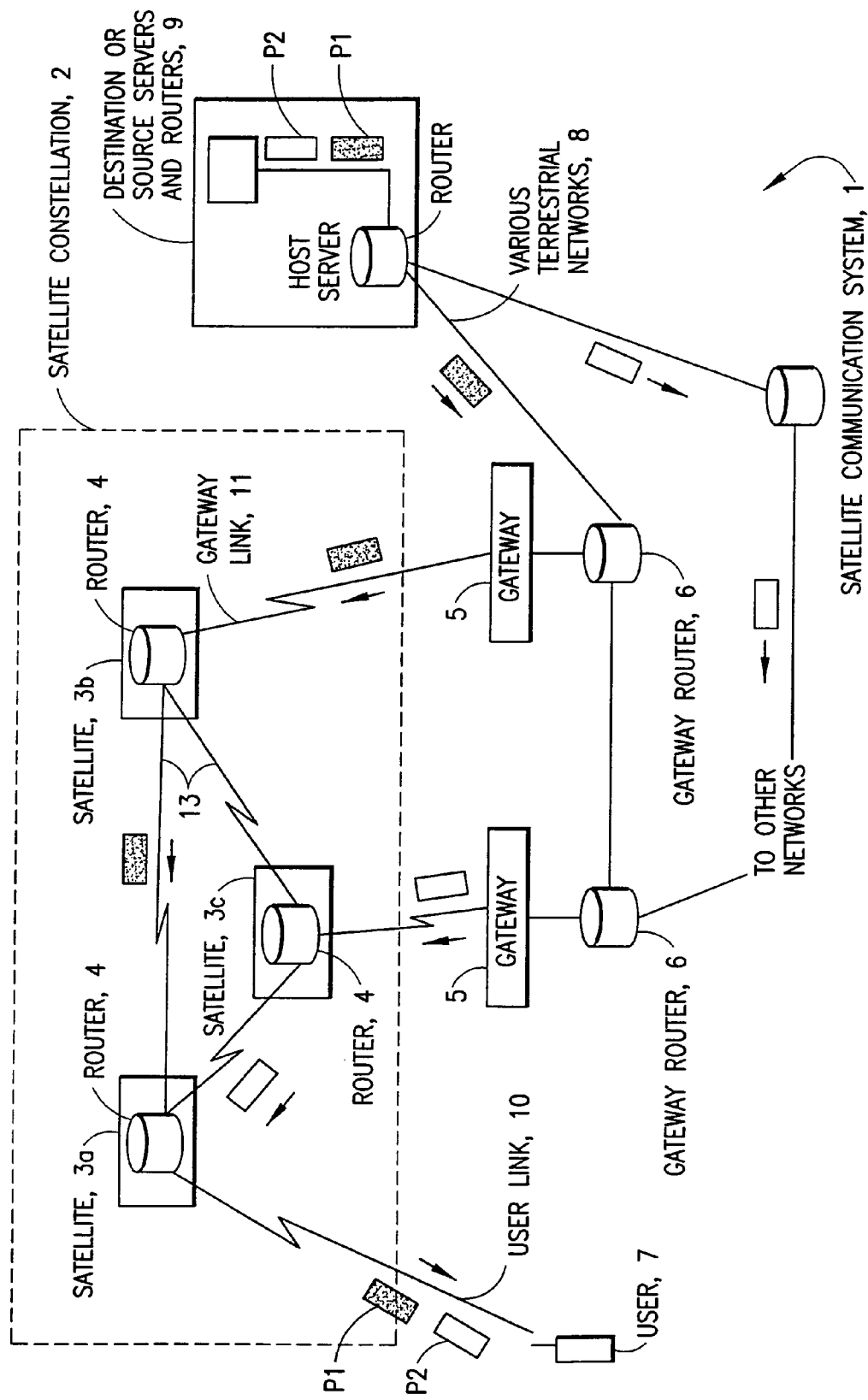
FIG. 5A is also related to FIG. 3, and illustrates the operation of sending packets from the host to the user in a first embodiment.

Referring to FIG. 5A, a host server located in a destination or source location sends packets to the user 7 in a similar method to that of FIG. 4A. The packets are formed in the host server or computer and sent to a router 9 and thence to various terrestrial networks 8. For a simple example, first consider transmission of the packets to the user 7 by a single satellite 3a. The router 9 makes decisions about the paths to send the packets. The example in FIG. 5A shows packet P1 following one path, and packet P2 following another. In fact, sequential packets may be routed via various paths or over a single path to gateway router(s) 6. When a packet arrives at gateway 5 it is uplinked via gateway link 11 to one or more of the satellites 3. Packets such as P2 which arrive at a different gateway 5 are also processed and sent to a satellite 3 over link 11. In the illustrated example the satellite 3b receives the packet P1 and the satellite 3c receives packet P2, and then individually provide them to their respective routers 4. The routers 4 operate on the received packets first by calculating an optimal path, depending on the routing algorithm used. In this example satellite 3b determines that, at that instant, satellite 3a will receive the packet P1 and puts it on the link to that satellite, and sends it on its way. Satellite 3c operating on the packet P2 determines that, at that instant, satellite 3a is also optimum for transmitting the packet and puts it on the link to that satellite. While it is possible that sequential packets may be sent to the same satellite, it is not necessary, and in this embodiment the path is chosen independently for each packet depending on the state of the information of the router 4 in the satellites 3b and 3c. In any case, packets P1 and P2 are received by satellite 3a and operated on by its router 4. This router determines if it should be sent on to another router in another satellite or sent to the user. Assuming that the determination of the router in satellite 3a is that the packets should be sent to the user 7, it puts P1 and P2 on the user link 10 and transmits them to the ground where they are received by the user 7. The Network Layer and transport layer software at the destination 9 then reassembles the IP fragments, puts the packets in their proper order and delivers them to the server application.

Figure 5B:
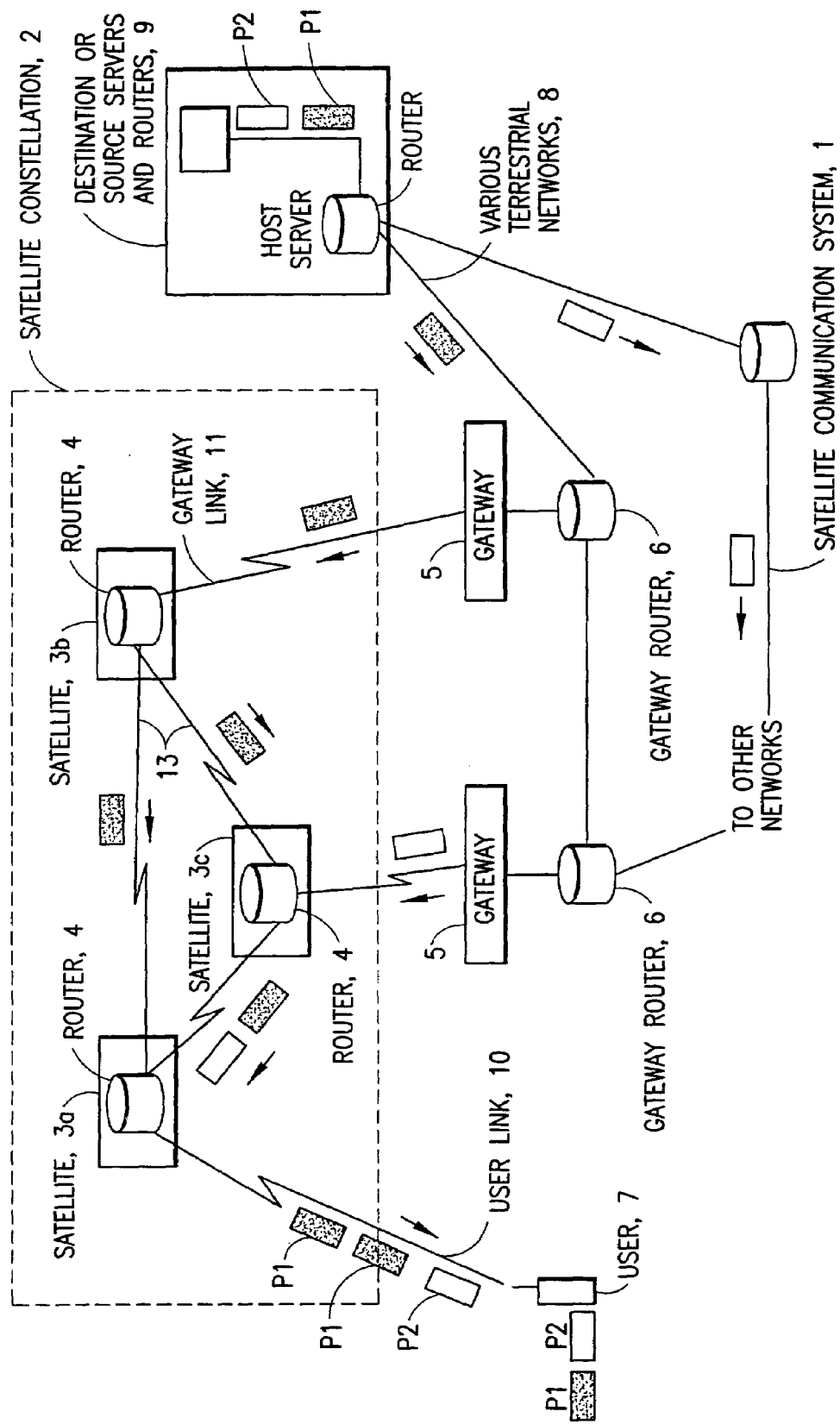
FIG. 5B illustrates the operation of sending packets from the host to the user in accordance with the second embodiment, wherein the same packet is sent from one node to two or more connected nodes.

FIG. 5B shows an embodiment wherein satellite 3b has elected to send packet P1 to satellite 3a, and to also send packet P1 to satellite 3c. As in the embodiment of FIG. 4B, in this embodiment multiple copies of the same packet can coexist within the system 1, and can arrive at different times at the final destination, in this case the user terminal 7. Note that satellite 3c routes both the uplinked packet P2 to satellite 3a, as well as the cross-linked copy of packet P1. Satellite 3a then subsequently transmits three packets to the user terminal 7, specifically packet P2, followed by two copies of packet P1. At some other time the order may be P2, P1, P1; or P1, P2, P1, depending on path lengths and propagation delays. The TCP/IP software operating in the user terminal 7 (described below with reference to FIG. 10) is responsible for detecting and deleting the duplicate copy of P1, as well as reordering, if necessary, the packets into the correct order P1 followed by P2. It is within the scope of this invention to also provide for the detection of duplicate packets in one or more of the satellites 3, and to delete the duplicate packets in space. By example, the satellite 3a may be operable for detecting the presence of duplicate packets, and for ensuring that only one packet is transmitted on the downlink to the user terminal 7. Data in the TCP portion of the packet, such as the sequence number (see FIG. 9), can be used for this purpose, as described in further detail below.

In general, multiple packets can be generated in two ways. First, the user terminal 7 when communicating toward the host can send its packets via two or more satellites 3, by simply transmitting the same packet towards more than one satellite from an omni-directional or near omni-directional antenna. The multiple copies of the same packets are then received by the individual satellites 3 and the operation is as described above. The packets received by each satellite 3 are processed and are transmitted toward a destination gateway 5. As such, it can be appreciated that there may be two or more independent paths taken by the multiple copies of the same packet, and that the same packet may arrive at the gateway 5 from two or more different satellites 3. Alternatively, the multiple copies of the same packets may arrive at two or more different gateways 5 and be injected independently into the Internet. This robustness is important in the satellite environment, since the links involved are generally less robust than terrestrial links.

Figure 15A:
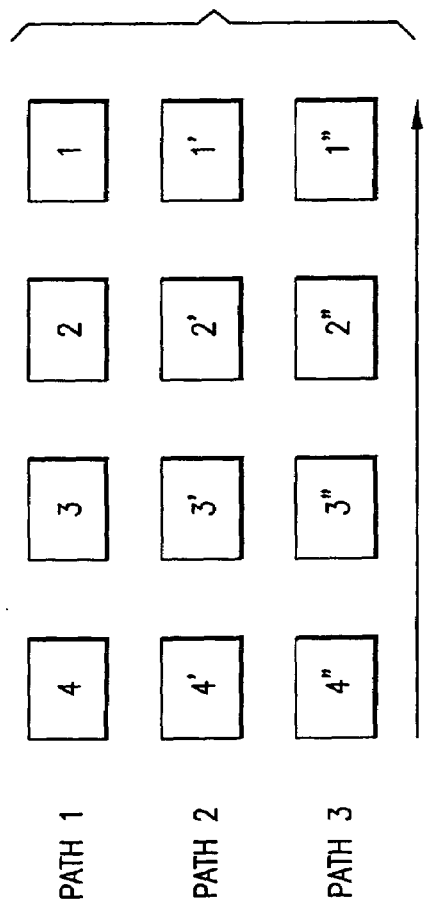
FIGS. 15A–15F are diagrams that are useful in explaining the arrival and use of multiple packets having the same sequence number.

As an example, FIG. 15A shows packets arriving at the destination over three different paths. The sender sends four packets 1, 2, 3 and 4 to the destination. There is a TCP time-out associated with these packets. If all the paths are good, then the destination will receive three packets (for example, 1, 1' and 1" as shown in FIG. 15A) for every packet transmitted by the sender. In other words, the receiver may receive multiple, duplicate packets. In general, several possibilities then exist at the receiver, as discussed below.

Figure 15B:
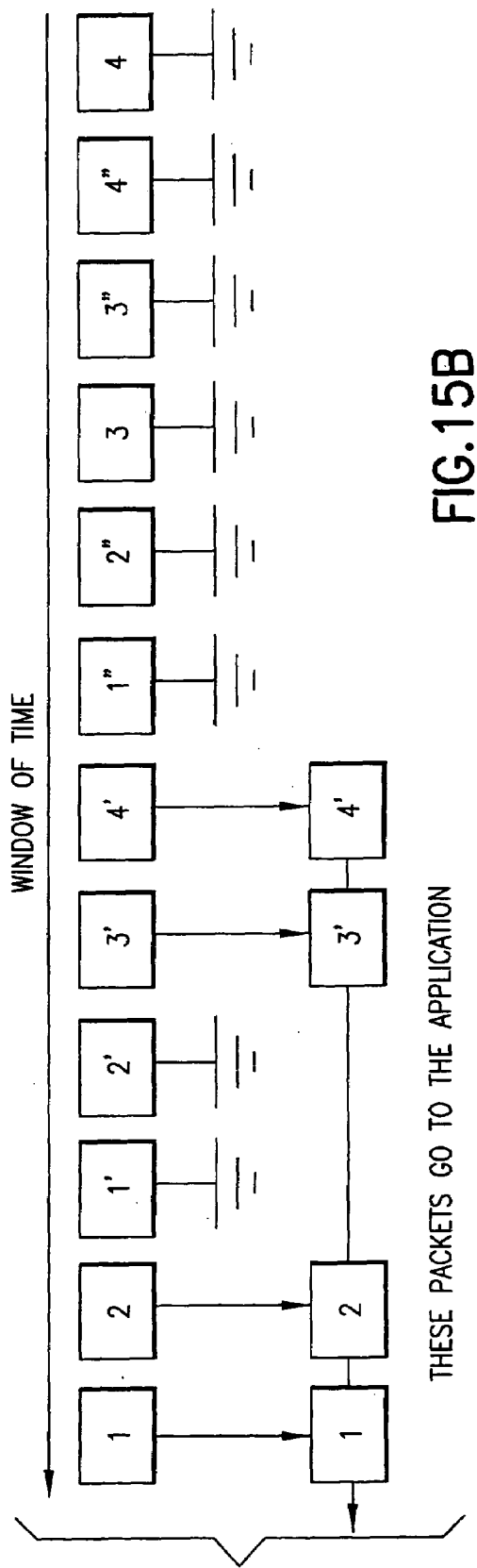

As shown in FIG. 15B, the packets arrive in a timely manner, and are not corrupted. In this case the redundant packets are simply ignored when sending packets 1, 2, 3 and 4 to the application that will consume or otherwise use the packets.

Figure 15C:
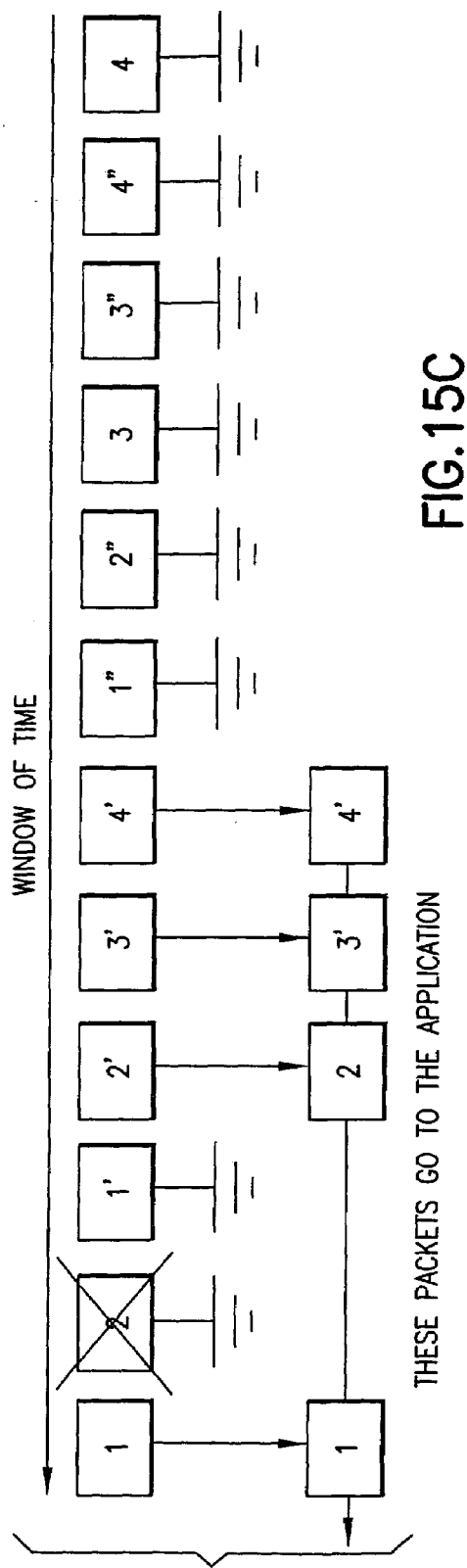

As shown in FIG. 15C, the packets arrive timely, but one packet (packet 2) of the multiple packets is corrupted. A redundant packet (arriving within the time-out period (packet 2' in the example)) is recognized, and is used in place of the earlier arriving but corrupted packet 2. Any subsequently arriving redundant packet(s) are ignored.

Figure 15D:
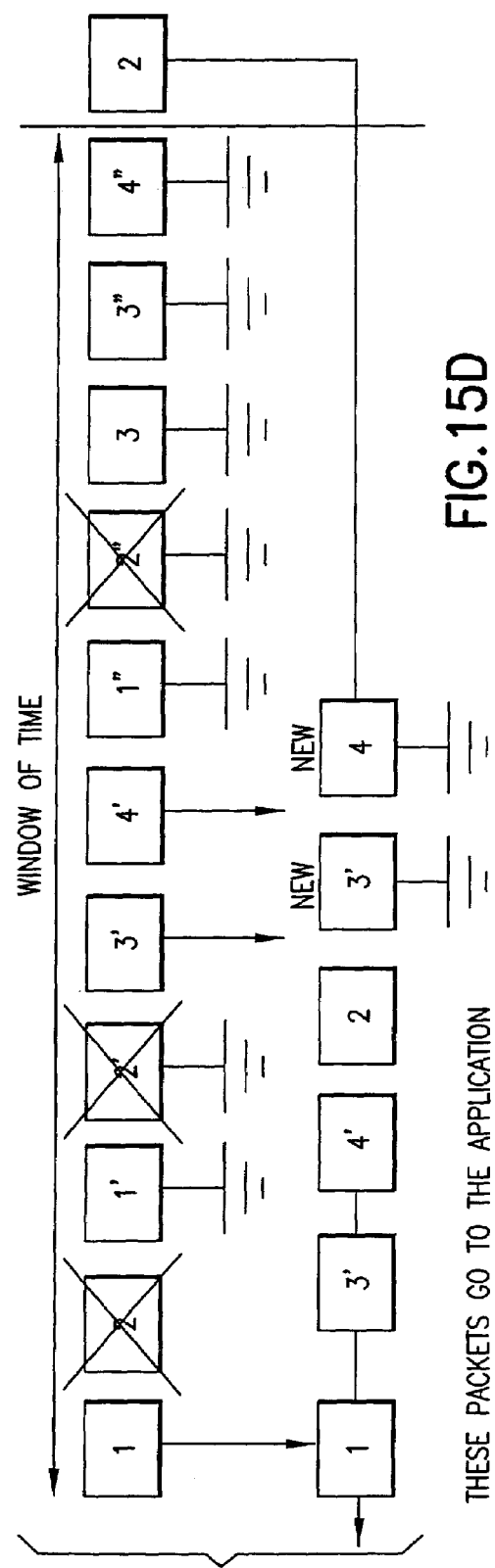

Referring now to the case shown in FIG. 15D, the packets again arrive in a timely manner, but all packets with the same sequence number (sequence number 2 in this example) are corrupted. The first (packet 2) and the subsequent packets (packets 2' and 2") of this sequence number are thus ignored. After the timeout period, and in the absence of an acknowledgement or in the presence of a specific non-acknowledgment, the sender equipment starts the retransmission of packet 2 and all the packets subsequent to packet 2 (packets 3 and 4 in this example). When the receiving host computer receives packet 2 (in the form of 2, 2' or 2"), it reassembles all the packets (in this case, packets 1,2,3,4) and lets the sender know through acknowledgement that it is waiting for packet 5 if the sender intends to send it. If the sender then receives this acknowledgement before it has finished retransmission of packets 2, 3 and 4, the sender will abort retransmission activity, and begin to transmit packet 5.

Figure 15E:
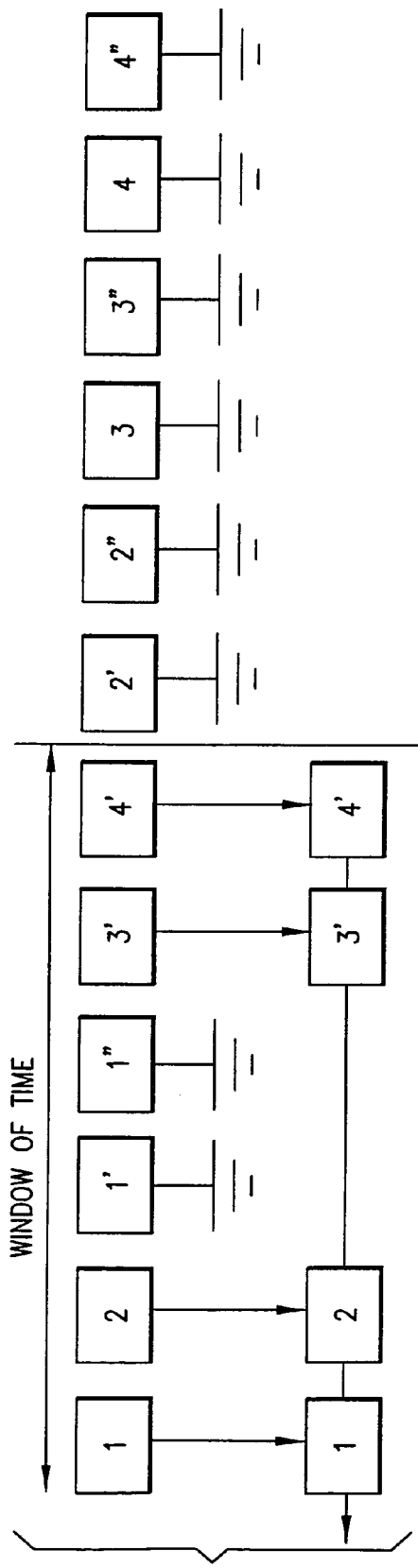

Referring to FIG. 15E, the packets arrive in a partially timely manner, for example, the first packet of a sequence number (for example packet 2) is within time, but the redundant packets 2', 2" are not. If the first packet of sequence 2 is not corrupted it is used, and the subsequent packets that are in time or late are ignored.

Figure 15F:
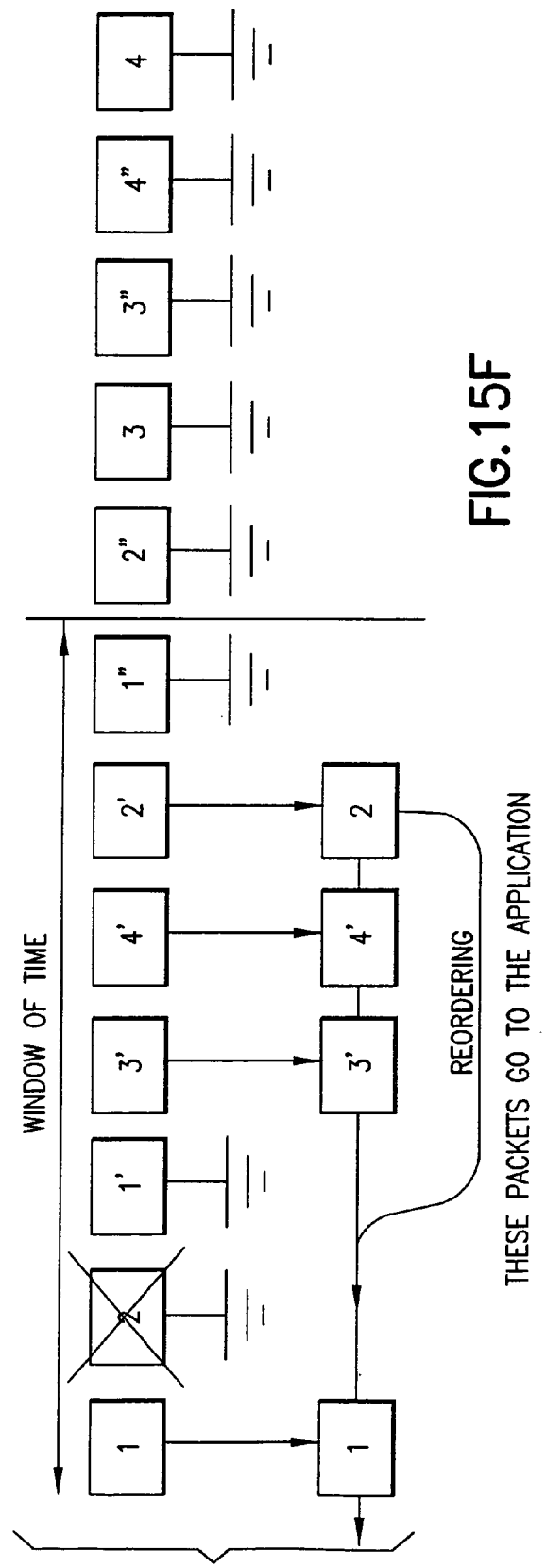

Finally, and referring to FIG. 15F, the packets again arrive in a partially timely manner, but one packet (e.g. packet 2) is corrupted. In this case one of the subsequent redundant packets (e.g. packet 2') that arrives within the timeout period is recognized and used, and any subsequent redundant packet is ignored. If, however, no redundant packet is received before the timeout, then a packet that arrives after the timeout, and that is not corrupted, is used.

One of the advantages of sending multiple packets over multiple paths can be clearly seen in the case of FIG. 15E. If there were only one path, then the sender would time out if it did not receive an acknowledgement from the receiver. If the packet 2 was corrupted, then the receiver will not send the acknowledgement. In this case the receiver will simply wait until the retransmitted packet 2 arrives. However, the use of multiple paths increases the possibility of receiving an instance of the packet 2. Even if an instance of a packet arrives at the receiver after the timeout, the use of the "late" packet will still normally save time over the case of waiting for the arrival of a retransmission of the packet by the sender. Also, the arrival of an instance of the packet (before or after a timeout) can reduce significantly a required number of packet retransmissions from the sender.

In the reverse direction, the host computer 9 generates packets and introduces them sequentially into the Internet, and these packets arrive at the destination gateway 5. The gateway 5 can generate a single stream of packets and direct them to a satellite 3. Alternatively, the gateway 5 can, according to stored algorithms, operate on a user by user basis to generate multiple packets. The gateway 5 can send duplicate packets for all, or for only some users, via the satellites 3 that it can "see". Alternatively, the gateway 5 can transmit the single stream of packets to a single satellite 3, whose router 4 can then generate multiple packets that are transmitted by a least one, but preferably two or more satellites 3 in the direction of the destination user terminal 7. The user terminal 7 can receive the multiple packets and the process described above with respect to FIGS. 15A–15F can be applied.

Briefly, billing can be accounted for in several ways. First, the satellite system operator may simply account for the total number of packets sent through the system. The utilization of individual satellites 3 and/or a gateway 5 by a user can be determined on an individual session basis, or accumulated over time. Other means of billing are possible, as discussed in further detail below.

Figure 6A:
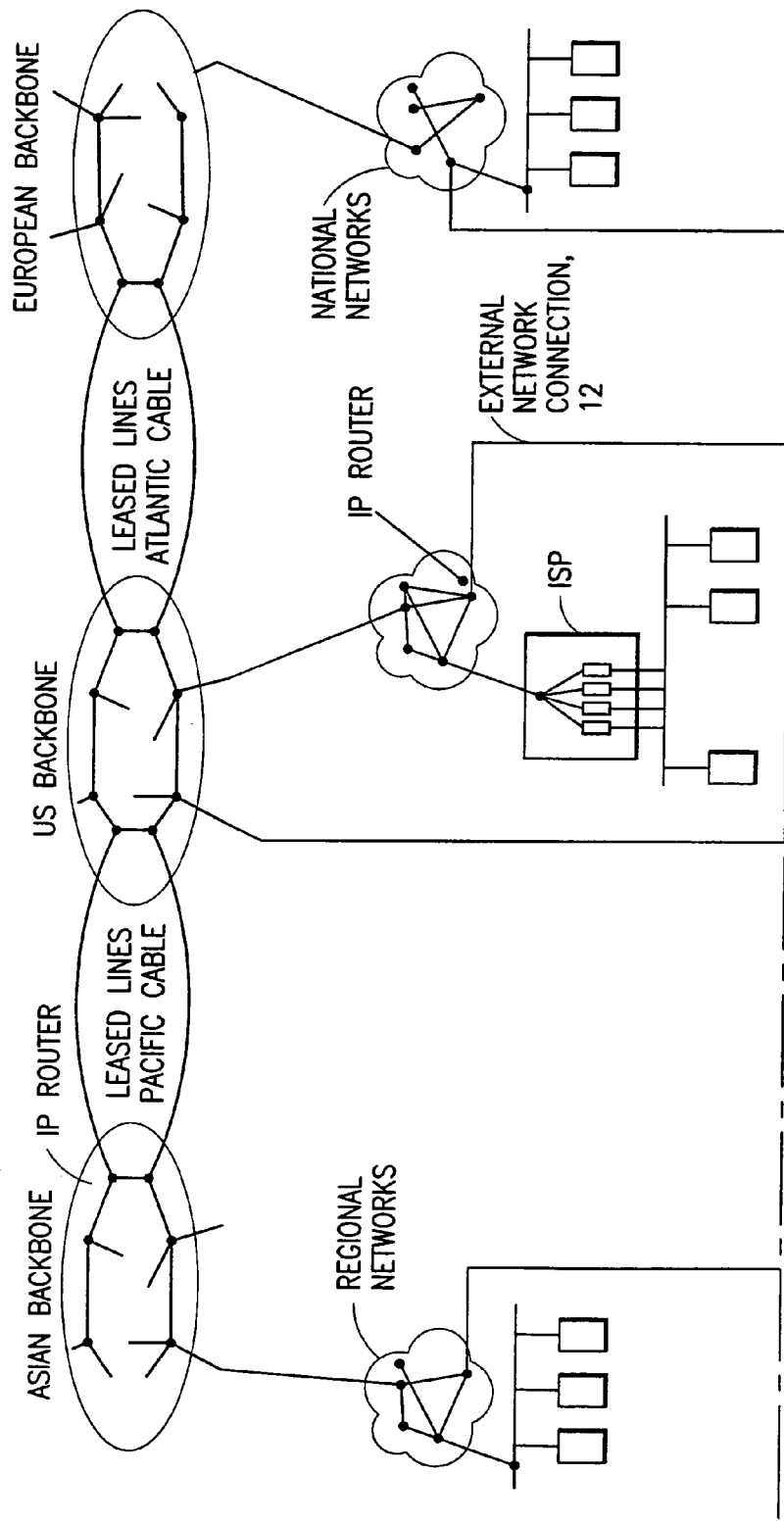
FIG. 6 is a network diagram, partly in block diagram form, that illustrates an example of how the connection-less satellite Internet access system of this invention can be integrated with the Internet.
Figure 6:
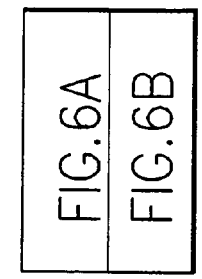
Figure 6B:
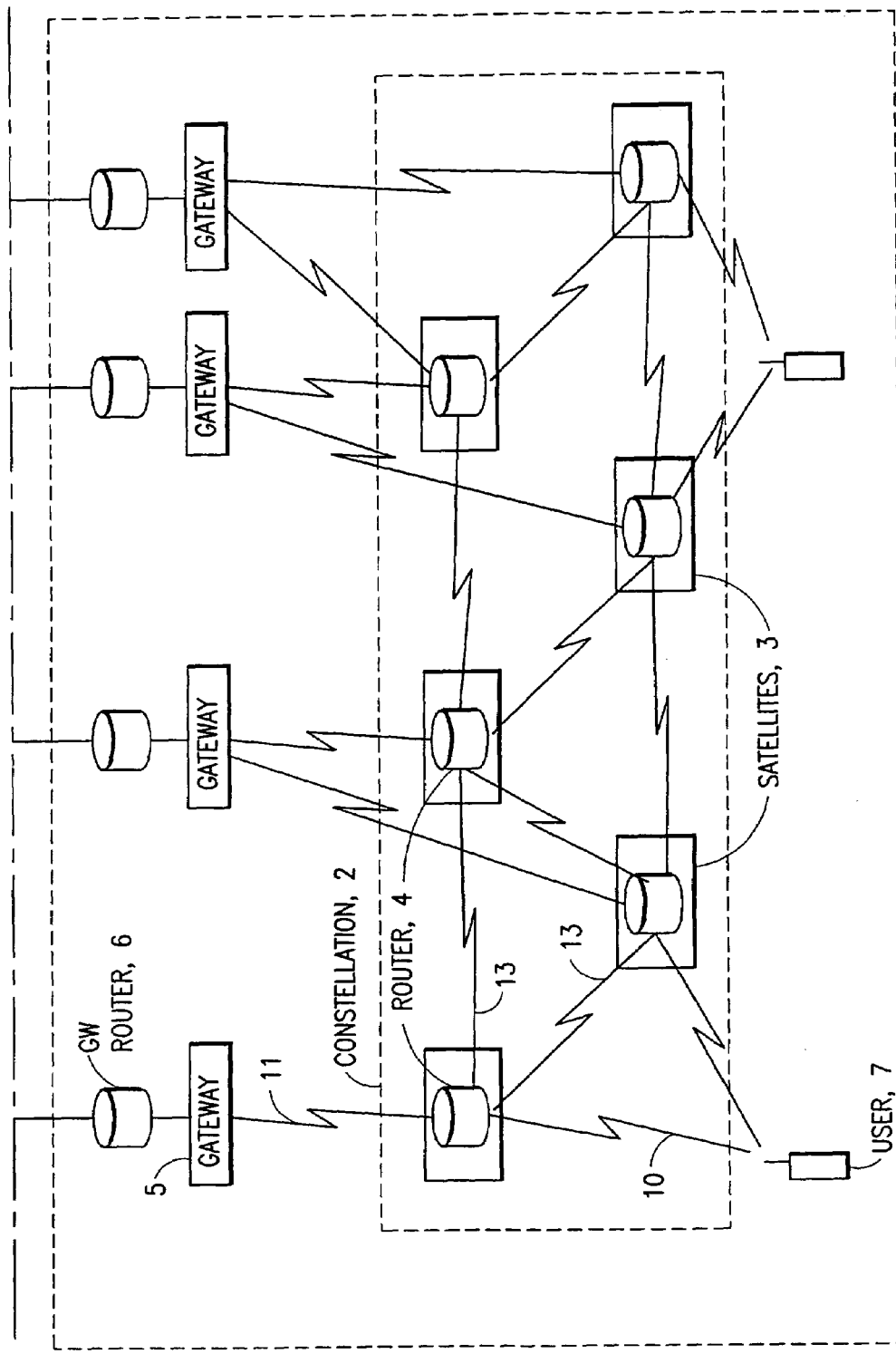

The above described system and operational method is integrated with various networks in the world, as depicted in FIG. 6. Four gateways 5 and routers 6 are shown, however, there can be more or less than this number. The gateways 5 may be connected via their routers 6 and external network connections 12 to routers of various and different other networks. In general, the gateways 5 will be connected to Regional Networks, National Networks, Commercial Networks, Internet Service Providers (ISPs) or directly to the high speed international backbon network. These external network connections 12 may be of various types of physical communication channels, such as copper wire, baseband coaxial cable, broadband coaxial cable, fiber optics, or wireless transmission (radio, microwave, or laser). FIG. 6 makes it clear that the user terminal 7 can obtain data from a wide variety of local area networks, interne users of all sorts, and a vast array of Internet users and servers on a global basis.

A discussion will now be made of the satellite constellation 2. It is first noted that there is no limit on the number of satellites 3 or the configuration of the orbits used by the constellation 2. However, in a preferred embodiment a Low Earth Orbit (LEO) constellation is used. Since one of the difficulties of data transmission using TCP/IP or other protocols is the inherent delay in the transmission of the packets, the LEO constellation has an advantage over other constellations such as medium earth orbit (MEO) or geosynchronous earth orbit (GEO). LEO satellites situated closer to the surface of the earth are able to communicate with the user 7 in a shorter length of time than satellites located at higher altitudes. Further, LEO satellites can offer diversity and better connectivity to local gateways. However, LEO (and MEO) satellites move from point to point in their orbits over the surface of the earth and therefore are not stationary with respect to their coverage zones. In previous LEO Mobile Satellite Systems, which are connection based, this means that the call (i.e. the connection) must be handed off from one satellite to another as the satellites move around the earth with respect to a user who is located in some geometric service area on the ground. However, in accordance with this invention the necessity to "hand off" the call is avoided and is not necessary. In fact, the user is constantly in communication with the constellation 2, not necessarily any specific satellite, and is receiving packets from any satellite router 4 which can "see" the user. Since the routers 4 are individually routing packets to the user in a connection-less manner, there is no need to hand off the user. With this invention, the user 7 may be located in a specific location, or may be mobile and moving. Since the addressing uses TCP/IP or other similar protocols, there is no need for a telephone number, although it may be convenient to represent the address as one. In addition, there is no need for a Home Location Register (HLR) or a Visitor Location Register (VLR) to log users in and out of the system 1 as in cellular systems, although they may be used for convenience. Since users only transmit packets when they have traffic, and since they are operated in a connection-less manner, the user may be always connected to the system 1 much in the same manner that user PCs are always connected to a local area network, and only transmit data when they have traffic. Since the network software in the gateway 5 is processing the packets of data to and from the user 7 to the external networks (e.g., regional and national networks), it has knowledge of the amount of traffic in, for example, bits or bytes that the user 7 is handling, as well as a time stamp of the initiation and final delivery of messages.

The gateways 5 are preferably connected together by a Wide Area Network (WAN). For the cases where the user communication goes through multiple gateways 5, the communication between the gateways 5 enables proper billing. Therefore, it is possible to account for the traffic to and from a given user terminal 7 individually, and to bill the user terminal 7 in an appropriate manner for his or her system usage. A gateway router is receiving packets from the user terminal 7 and those being sent to the user terminal 7. The gateways 5 can be connected together either by a dedicated network, also called the GDN (Ground Data Network). Alternatively, the gateway routers 6 can interface to each other through the Internet to deliver billing information. Since the user terminal 7 can always be connected to the system there is no need for a log-in procedure, although it may be convenient for other purposes.

Figure 7:
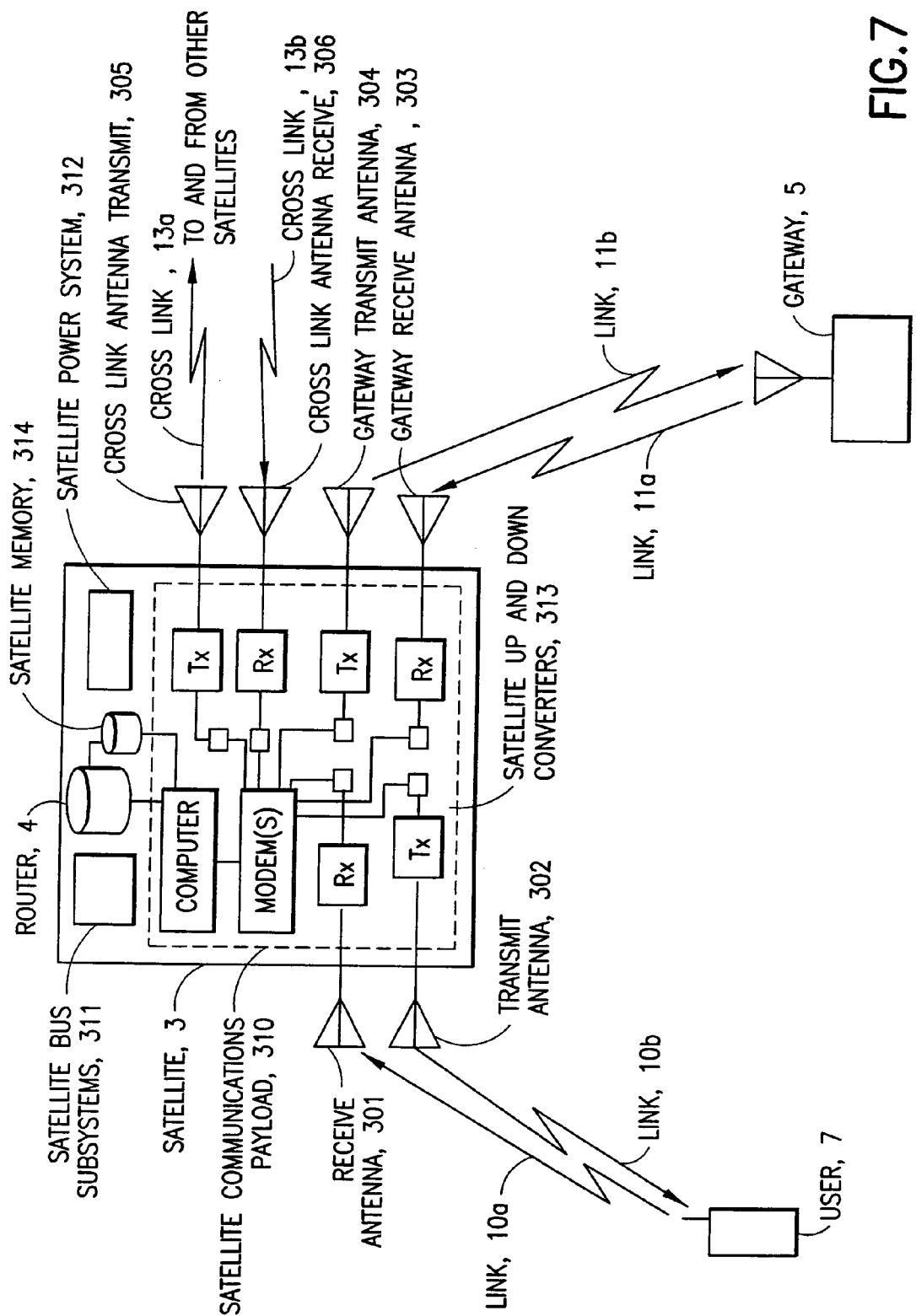
FIG. 7 is a block diagram of the satellite system in accordance with this invention, and shows a more detailed block diagram of one of the communication satellites.

A description of a typical satellite 3 is provided in FIG. 7, which represents but one of potentially many different suitable configurations. The basic premise is that signals arriving from either users 7 or gateways 5 are received, down-converted, and processed as baseband signals wherein the TCP/IP packets are detected and processed. In FIG. 7 the user 7 signals are transmitted to the satellite 3 on link 10$a$ and received by the satellite antenna 301 and sent to the receiver of the satellite communication payload 310. After reception by the payload 310, the Radio Frequency (RF) signal is down-converted from RF to baseband and sent to demodulators of the payload modem(s). The demodulated signal data output bit stream is then applied to an on-board computer which uses stored algorithm and which operates to send the packets of user data to the router 4. In the manner discussed above, the router 4 determines the destination path for the packet to be routed to. This path may be to a ground transmit antenna 302 or 304, or to another satellite or satellites via cross-link transmit antenna(s) 305. In any case, the packet is then sent back to the computer and thence to the modem(s) where the packet is mixed with other similar destined packets and applied to the proper up-converter for transmission to the destination path. After up-conversion the bit stream containing the user 7 packet is amplified and transmitted to its next destination. If the choice of destination is another satellite it is amplified by the cross-link transmitter and applied to the cross-link transmit antenna 305 and sent over the cross-link 13$a$. If the choice was to send the packet to the ground node the packet is amplified by the gateway satellite transmitter and applied to downlink link 11$b$ through gateway transmit antenna 304.

The packets from a gateway 5 are sent over uplink link 11$a$ and are received by satellite gateway receive antenna 303 and applied to the gateway/satellite receiver of the satellite communication payload 310. After reception by the payload, the RF signal is down converted from RF to baseband and sent to demodulators of the payload modem(s). The demodulated signal data output bit stream is then applied to the on-board computer which, using the stored algorithms, operates to send the packets of user data to the router 4. In the manner discussed above, the router 4 determines the destination path for the packet to be routed to. This path may be to the user transmit antenna 302, or to a specified other satellite or satellites via the cross-link antenna(s) 305. In any case, the packet is then sent back to the computer and thence to the modem(s) where the packet is mixed with other similar destined packets and applied to the proper up-converter for transmission to the destination path. After up-conversion the bit stream containing the gateway 5 packet is amplified and transmitted to its next destination. If the choice of destination is another satellite it is amplified by the cross-link transmitter and applied to the cross-link antenna 305 and sent over the cross-link 13a. If the choice was to send the packet to the user 7 the packet is amplified by the user satellite transmitter and applied to user downlink 10b through transmit antenna 302.

The satellite 3 includes multi-beam user receive and transmit antennas which may be static or directed toward specific locations. The satellite gateway antennas 303, 304 may be a single beam which is fixed, pointed or steered to a particular point on the ground. Alternatively, the satellite gateway antenna may be a multibeam configuration. The cross-link antennas 305, 306 may be simple or complex, and will in general track other satellites 3 of the constellation 2, and may be able to be pointed on command or under the control of the onboard computer. There may be more than one set of equipment for each of the Transmit/Receive functions. For example, there can be several cross-link Transmit/Receive (T/R) systems for tracking and communicating with more than one satellite at a time. This payload may be interconnected with other satellite communication payloads for further flexibility of communications. The satellite 3 also has a power system 312 which includes solar arrays for generating power from the sun, batteries for use when the satellite 3 is in eclipse, and a power conditioning system to regulate the power. In addition, there are other bus subsystems 311 which point, support, process telemetry and command data, and perform other functions. A satellite memory 314 is used to store the above-mentioned routing algorithm(s) and any tables and data associated therewith, as well as to provide temporary storage of received packets (store and forward), as well as to provide whatever other program and data storage is required by the onboard computer(s).

Figure 8:
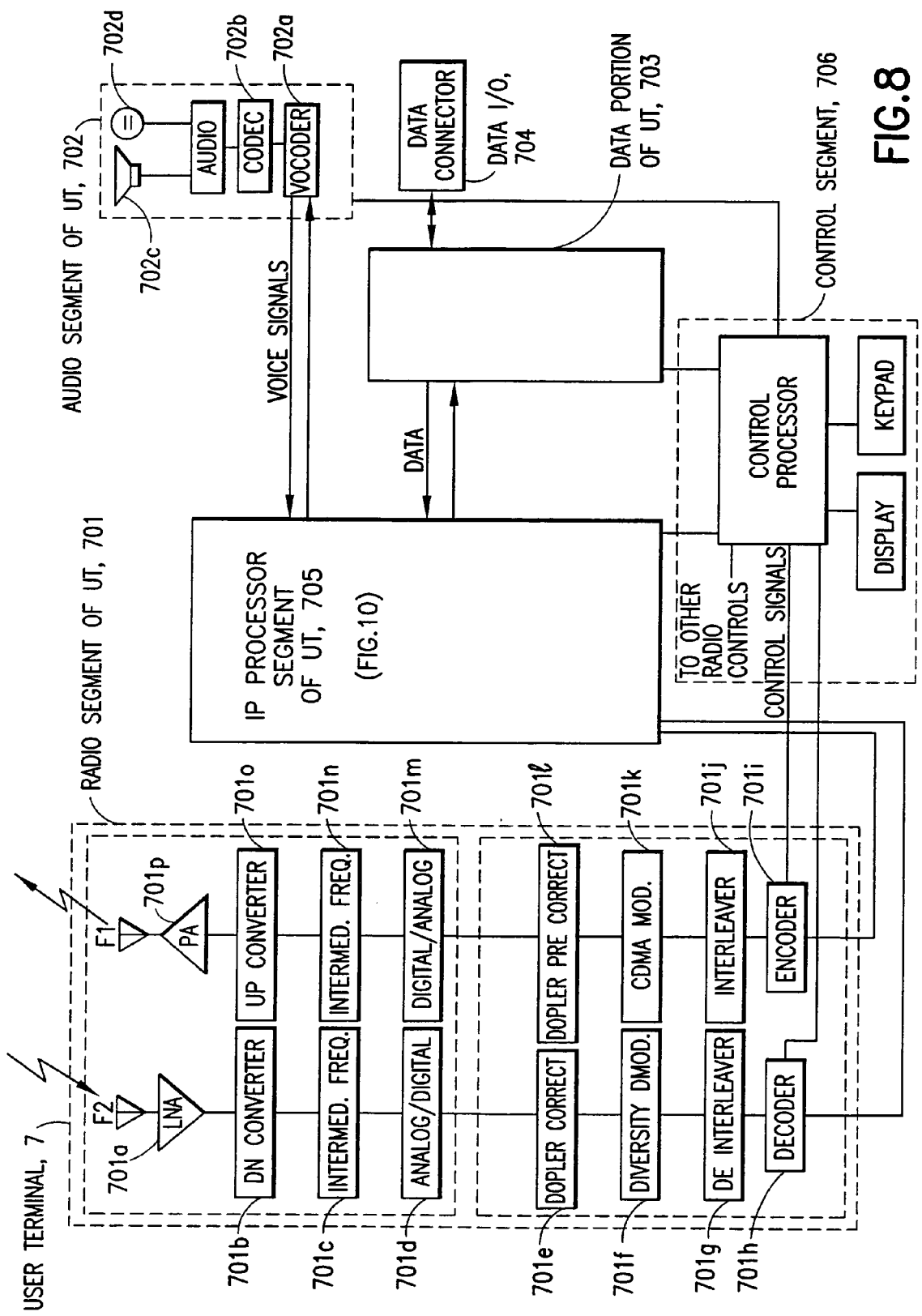
FIG. 8 is a block diagram of a satellite mobile Internet access user terminal.

FIG. 8 depicts a user terminal 7 configuration. The user terminals 7 receive packets of data, decode the received packets, and deliver the data payloads contained within the packets to other devices, such as computers or display devices, and associated software to perform various tasks. User terminals 7 also form packets of payload data, encode the packets, and transmit them to the satellite constellation 2. These user terminal functions may be combined with other user terminal functions, including previous circuit switched (connection based) types to form multiple mode terminals capable of acting as both a connection based or a connection-less based communication device. These multi-mode terminals may, in addition, be capable of functioning in both in the satellite mode or in a terrestrial mode. Such "dual mode" or even "tri-mode" devices can be operational in either a satellite based circuit switched (connection based) system or a terrestrial based circuit switched system. For the purposes of this invention, "dual operation" is considered to mean a capability of operating within either a connection based or a connection-less network, while "dual mode" is considered to mean a capability of operating in either a terrestrial network or a satellite network.

For simplicity, only a single mode, single operation user terminal will be described. Referring to FIG. 8, a User Terminal (UT) 7 contains a Radio Segment 701 which is bidirectionally coupled to the satellite constellation 2. The wireless links coupling the UT 7 to the satellite constellation 2 are received and transmitted on frequencies F1 (transmit) and F2 (receive). These frequencies can be in different portions or bands of the radio spectrum, different frequencies within a specified band of frequencies of the radio spectrum, or they can both be on the same frequency of the radio spectrum.

In any case, the received frequency (F2) is amplified in a low noise amplifier (LNA) 701a, and then down converted to an intermediate frequency (IF) or to baseband using components 701b and 701c. FIG. 8 shows the case where the received frequency is down converted to an intermediate frequency. The signal can be further down converted or may be utilized in some other manner. In any case the signal is converted from analog to digital in an analog to digital converter (ADC) 701d and applied to a doppler correction circuit 701e and thence to a demodulator 701f. The demodulator 701f can be of any type which is able to decode the signals transmitted from the satellite(s). For example, the demodulator 701f may be capable of demodulating a particular kind of modulation such as Frequency Division Multiple Access (FDMA), Time Division Multiple Access (TDMA) signals of various types (including Frequency Hopped), or Code Division Multiple Access (CDMA). The remainder of this description describes a CDMA modulation type, but those skilled in the art will recognize that many types of modulation (and corresponding demodulation) are possible. The received signal(s) are thus applied to a CDMA demodulator 107f which separates signals received from one or more satellites and, after detection, applies them to a combiner to get the maximum signal strength. After combining the signals are deinterleaved in unit 710g and sent to a decoder 701h. The decoder 701h further processes the signals and sends the decoded signals to an IP processor 705 (shown in FIG. 10). The IP processor 705 extracts the message payload from the packet and either sends it to an audio segment 702 for voice extraction, or to a data segment 703 for data formatting. If the signal is voice it is applied to a vocoder 702a thence to a codec 702b and is finally amplified and applied to a speaker 702c. If the message is data, the payload is applied to a data portion 703 and may then be routed to a data I/O connector 704 which sends the received data to another device, such as a computer or any other device capable of utilizing data. The data I/O connector 704 could be connected to a data communication network, and the other device or devices utilizing the received data could be located at considerable distance from the UT 7. In general, the other device may be integrated into the satellite mobile interne access user terminal 7, or they may be separate therefrom.

The UT 7 is also capable of transmitting data, acknowledgements and other information. In order to perform this function the UT 7 encodes the data with the TCP/IP protocol, forms a packet with this information, and transmits the packet towards the satellite communications system. The UT 7 can provide and transmit at least two kinds of messages, specifically voice messages and data messages. For voice messages the UT 7 audio segment 702 has a microphone 702d which amplifies the voice input and sends it to the codec 702b. The codec 702b converts the voice input to a digital signal and sends it to the vocoder 702a, which takes the codec output and reduces the data rate to a smaller value. Typical vocoders can produce packetized voice in various packet time lengths (such as 20 ms) at data rates from 14 Kbps down to 2.4 Kbps. Voice quality depends on the algorithms used, the rate sent, and other factors. Both fixed and variable rate vocoders can be used in the UT 7. In any case, the vocoded packets are sent to the IP processor segment 705 of the UT 7 where further operations are performed. Data, on the other hand, is inputted from the data I/O connector 704 and routed to the data portion 703 of the UT 7. The data portion 703 operates on the input data to packetize it into various formats as required. Alternatively this function can be accomplished in the IP processor segment 705 after the input data stream is applied to the IP processor segment 705. In either case, the packetized voice or data is wrapped as a payload and placed into a packet that conforms to the TCP/IP protocol (or any other packet protocol that may be of interest). Other functions can be performed by the IP processor segment 705, such as adding another protocol specific to the transmission over the wireless system, such as a Radio Link Protocol (RLP). If used, the RLP can be stripped off either in the satellite 3 or in the gateway 5, leaving the TCP/IP packet intact. While there may be various versions of protocols, or different protocols than TCP/IP that can be used by this invention, it is instructive to use TCP/IP as a model for explanation.

Figure 9:
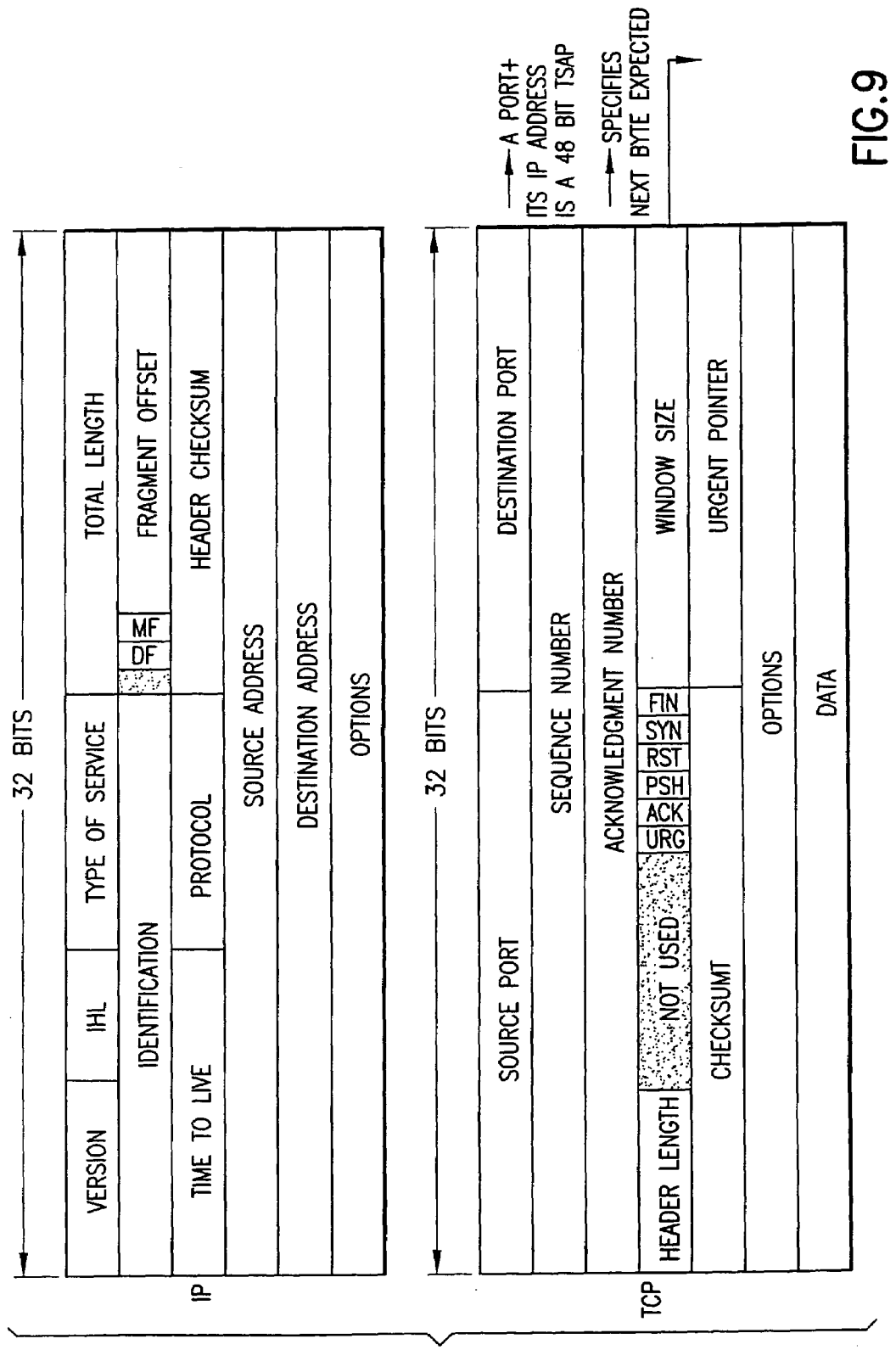
FIG. 9 is a depiction of IP and TCP packet structures.

The structure of a conventional TCP/IP packet is shown in FIG. 9. One important feature of interest is the Transfer Service Access Point (TSAP). The TSAP is the end point definitions of the pair of machines that are communicating. The TSAP is made up of two parts, and each of these parts are further made up of two elements. The first part is the Source end point, and the second is the Destination end point. Considering first the Source, its definition is the IP Source Address plus the TCP Source Port number. These two sequences are stored in the UT 7 or are passed to the UT 7 from another connected machine or computer. During the initial period of transmission to the destination the source machine determines the Destination Address and the Destination Port number and fills out the fields of the TCP/IP packet header. The other fields are used for transport control and integrity checking, verification of reception, triggers to start and stop additional packets of data, and to signal end of transmission. Every host computer and router on the Internet has an IP address. In this invention the UT 7 can sometimes be the host, and at other times can be a device coupled to a host. Therefore, the UT 7 has its own IP address, and an ability to bypass the IP address and to use instead the IP address of a host coupled to the UT 7.

Figure 10:
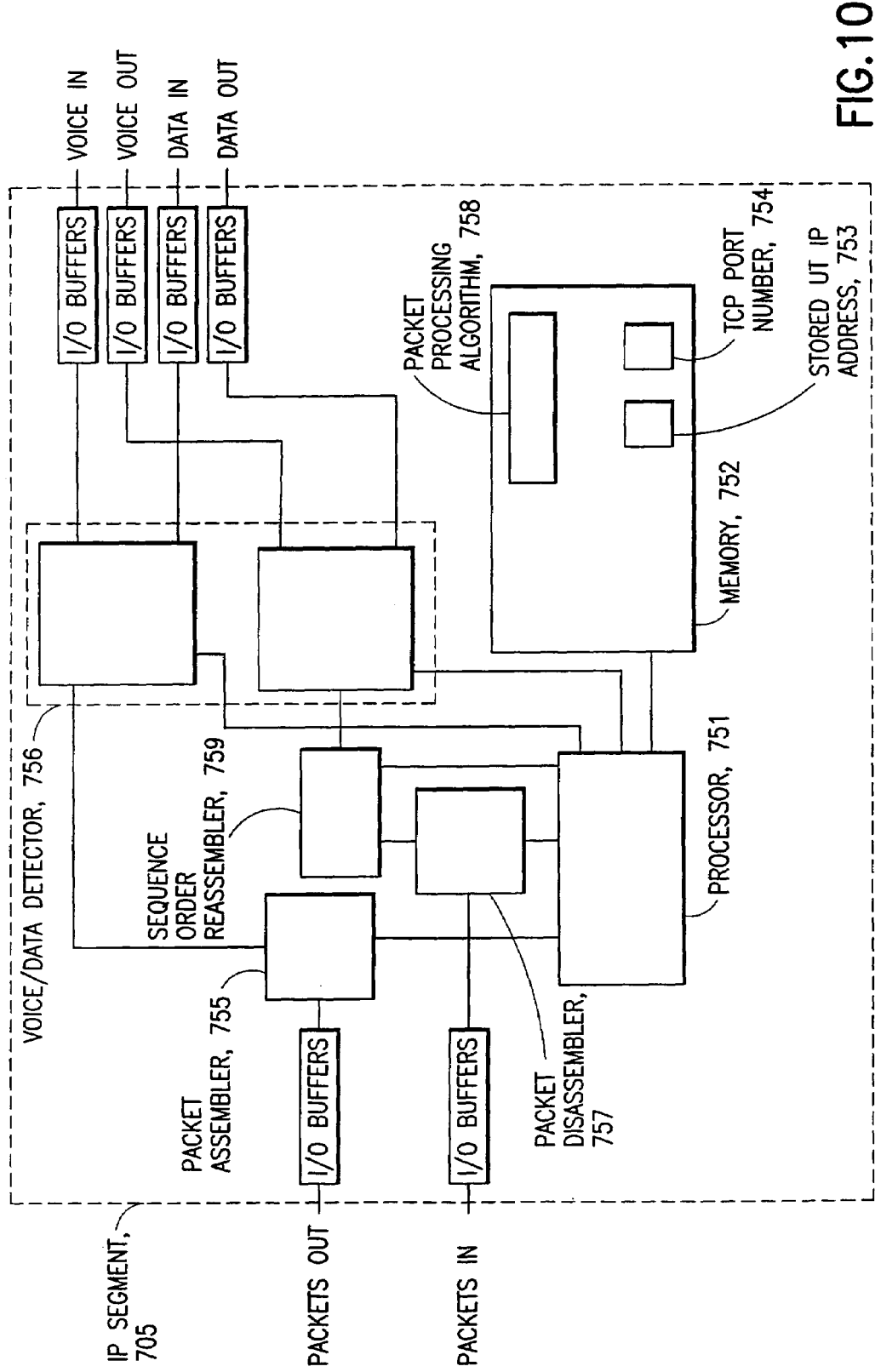
FIG. 10 is a block diagram illustrating the IP processor segment of the satellite mobile Internet access user terminal of FIG. 8.

Referring now as well to FIG. 10, the IP processor segment 705 of the UT 7 is shown. The IP processor segment 705 includes a processor 751 which is coupled to a memory system 752, which stores an IP address 753 and a Port Number 754. These IP addresses are unique, with no two machines or UT's having the same number. The processor 751 and memory 752 are coupled to packet assemblers and disassemblers 755 and 757, respectively. In addition to these devices, there is a voice/data detector 756 to process the packets differently according to the needs of these two services. The voice/data detector 756 is coupled to the processor 751 which modifies the choice of packet header data in accordance with a stored algorithm 758.

The IP segment 705 operates in the following manner. For outgoing packets the IP segment 705 receives either voice IN or data IN packets through I/O buffers, which are then applied to the voice/data detector 756. The detector 756 then instructs the processor 751 as to which type of data is active. The processor 751, according to the algorithm 758 stored in memory 752, operates to selectively fill TCP/IP header fields in the packet assembler 755 with TCP/IP data as required. The detector 756 passes the packet to the packet assembler 755 where it is acted upon to append the data payload to complete the packet. The packet is then placed into an I/O buffer, if necessary, and is then sent to an encoder 701*i* of the UT 7 (see FIG. 8) for further processing. The packet is next passed through the transmit chain of the radio segment 701 of the UT 7, and is coupled to the UT antenna for transmission to the satellite constellation 2 at the transmit frequency F1. The transmit chain is constructed so as to be essentially the inverse of the receiver chain and includes, in addition to the encoder 701*i*, an interleaver 701*j*, a CDMA modulator 701*k*, a Doppler pre-corrector 701*l*, a digital to analog converter (DAC) 701*m*, an IF unit 701*n*, an up converter (IF to F1) 701*o* and a power amplifier (PA) 701*p*.

The UT 7 can also receive data, acknowledgements and other information. In order to perform this function the UT 7 decodes the input data, with the TCP/IP protocol, and applies the packets to a disassembler which separates the payload data and header information, and finally utilizes the information contained in the payload or passes it on to another device. The UT 7 can receive at least two kinds of messages, namely voice messages and data messages. Received packets are sent from the UT decoder 701*h* of radio segment 701 to the I/O buffers of the IP processor segment 705, if necessary.

Referring again now to FIG. 10, the decoded packets are received into the packet disassembler 757 where, acting under instructions of the processor 751, the packets are disassembled, with the header information being sent to the processor 751 and the payload being sent to the voice/data detector 756. The arriving (received) packets may be in a different order than the order in which they were first transmitted from the host. However, the packets can be reassembled in the proper order by an order reassembler 759, acting on instructions from the processor 751. Since at disassembly the header information in the TCP portion of the packet contains the sequence number of the packet, with respect to the other packets sent from the same host, the processor 751 is enabled to instruct the order reassembler 759 how to reorder the packets. After reordering, the data stream containing the packets is applied to the voice/data detector 756. The data payloads arriving at the detector 756 are parsed, under control of the processor 751, into either voice or data and are applied to an output buffer if required, and are thence sent to either the data segment 703 or the audio segment 702 of the UT 7 for further processing.

As was discussed earlier, the TCP/IP software operating in the user terminal 7, specifically the packet processing algorithm 758, may also be responsible for detecting and deleting duplicate copies of received packets, as well as reordering, if necessary, the packets into the correct sequence order. The sequence number field of the TCP portion of the packet can be used for this purpose.

Figure 11:
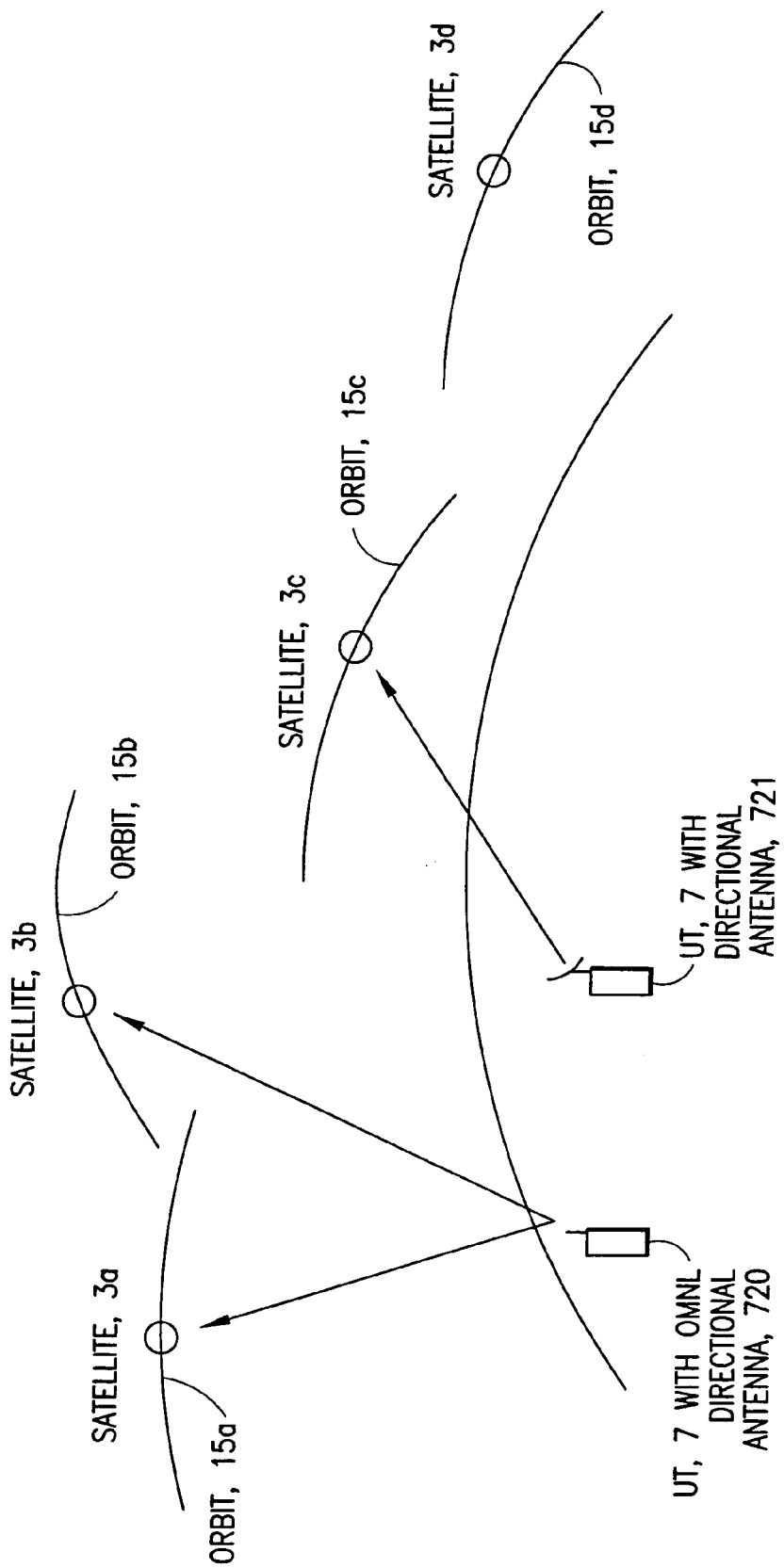
FIG. 11 depicts an example of outbound user terminal to satellite constellation links.

With regard to satellite reception from the user terminal 7, the constellation 2 receives RF signals (at FIG. 3) from the UTs. These signals may be directed toward one or more of the satellites using a directional antenna, or may be broadcast toward all visible satellites. FIG. 11 provides a graphic illustration of two techniques for the UT 7 to transmit to the constellation 2. In FIG. 11 there is shown a UT 7 with an omnidirectional antenna 720. Packets are transmitted toward the constellation 3 and, in accordance with this example, the packets are received independently by a satellite 3*a* in an orbit 15*a* and by a satellite 3*b* in an orbit 15*b*. In the other case, a UT 7 with a directional antenna 721 directs its transmission toward a specific satellite 3*c* in an orbit 15*c*.

Neither UT can view or transmit to satellite 3*d* in orbit 15*d*. In general, a UT will be able to see and transmit towards about two to three satellites at any given time. Only in the case of the omni-directional antenna 720 are two copies of the same packet intentionally received by two or more satellites. The redundancy afforded by the reception of the packets by two or more satellites provides diversity reception and, therefore, a more robust communications link, an especially important consideration for mobile communications systems. On the other hand, single satellite reception simplifies the transmission and overall signal processing operation. In either case at least one satellite receives the signals transmitted by a given one of the user terminals 7. The satellite communications signals deliver the baseband packets transmitted to the satellite router 4 (see FIGS, 1, 3, 4A, 4B, 5A, 5B and 7). The router 4, since no particular path has been worked out in advance, is charged with the responsibility of deciding what to do with the packet, and since each successive packet may be sent on different paths, cannot rely on what path the preceding packet has taken to make its decision. In order to perform this decision, the router 4 must know what paths it has available and what paths cannot (at least at the present time) be supported. Since the satellite-based routers 4 are moving with respect to the ground based gateway routers 6, the satellite routers 4 continually update their path availability, and keep track of nearby and distant other satellites routers, as well as the available gateways 5 and gateway routers 6.

There are several techniques for performing these functions. First, since the satellites of the constellation 2 are predictable in their orbits, and since the gateways 5 are not moving with respect to the surface of the earth, it is possible to maintain a database of these router addresses, and to map IP addresses onto the satellites of the constellation 2 according to a calculation algorithm based on geometry and system availability according to time. A second technique is to have each router 4 (and 6) broadcast its address periodically, and then have each router that receives the broadcast update its list of destination paths accordingly.

In any case, the router 4 knows at any given time which adjacent and neighbor routers 4 and 6 that it can communicate with. Various routing algorithms can be used to decide on the path to send the packet based on its detected destination address. One algorithm that can be used is referred to as an Open Shortest Path First or OSPF technique. OSPF is a common used algorithm for multi-access networks that have multiple routers. OSPF operates by abstracting the collection of available paths into a directed graph in which each path is assigned a distance, delay, and cost etc. Weighting of the various elements are assigned depending on the state of the network. In accordance with the teaching of this invention the satellite network could use availability, traffic loading, battery status, or other parameters to provide path selection data, as well as path weighting. A serial connection between any two routers on the graph is then represented by a pair of arcs, one in each direction. Their weights may be different, (i.e. the forward link may be substantially different than the return link). The end result is that the router can determine from the destination address the best path to the next router (shortest delay, or lowest cost, or best for traffic loading, or other parameters) to send the packet. Other algorithms may be used to achieve the same purpose.

In any case, the packet with its TCP/IP header intact is sent on to either another satellite and its router 4, or to a gateway 5 and its router 6. Two possibilities exist for forwarding subsequent packets to the same destination. If the satellite sub-network uses datagrams internally, this decision is made for every arriving data packet since the best route may have changed since the last time a packet was sent. If the satellite sub-net uses virtual circuits internally, path decisions are made only when a new virtual circuit is established. This latter case is useful to minimize packet delay and processing for voice over IP networks. Routing algorithms may be non-adaptive or adaptive. If a non-adaptive algorithm is used the paths are pre-chosen depending on, by example, previous historical data on traffic, and a router path lookup table can be used to send the packet with the specified destination to a predetermined path, based on the time of arrival, the available routers, and the satellite constellation ephemeris. In contrast, an adaptive routing may be used wherein the router 4 changes its routing decisions to reflect changes in the network topology and traffic in accordance with the packet destination. In either case a given one of the satellites (3*a*, 3*b*, . . . ) that receives the packet must resolve an east, west, north, south issue.

For example, consider the case where the user is in New York, N.Y., and uplinks a packet with a destination of Moscow, Russia to a satellite overhead. The satellite router may determine that there are two paths that can be derived, for example a path to a satellite east of itself or a satellite north of itself. In this case, additional decision parameters may be needed to resolve the ambiguity. In principle, the least delay will generally be the best path. In this case, since the router knows for this instant which satellite can be transmitted toward to achieve the lowest total delay, not just the lowest delay to the next satellite, it can determine which path to chose. Alternatively, it may calculate the total number of hops that the packet would have to make for each and choose the lowest hop count. Other routing algorithms may use Shortest Path Routing, Flooding or Selective Flooding, Flow based Routing, Distance Vector Routing, Link State Routing, Hierarchical Routing, either alone or in combination.

With the omni-directional UT antenna 720, multiple copies of the packet may be injected into the system simultaneously. The UT 7 does not actually send multiple packets, but copies of the transmitted packet are constructed in the two (or more) different receiving satellites. These packets then begin individual paths through the system. Since the destination of each packet is the same, and the sequence number of each packet is the same, the duplicate packet(s) can either be eliminated or used. For example, consider the same packet arriving at different times at two different satellites. One packet is routed to gateway X the other to gateway Y. Since each gateway does not know that the other is dealing with the same packet, each sends it on its way to the destination server. The destination server operates on the first packet and, since it knows its sequence number, it can destroy the duplicate copy or copies when they arrive. If one of the copies of the same packet is destroyed during propagation, then another copy of the packet can be used. If two or more copies of the same packet happen to be sent to the same gateway X, then gateway X may destroy the duplicate copy or copies after sending the first packet to arrive on into the Interne. Likewise, it is possible for the satellite routers 4 to detect the presence of redundant packets, and to destroy all but one (typically the first to be received).

The inter-satellite cross-links 13 were described previously. The cross-links 13 are used to route packets from one satellite to another so as to provide a path from a packet source to a packet destination. Multiple copies of the same packet may be automatically or selectively generated and transmitted by each satellite of the constellation 2 to adjacent satellite(s) and/or gateway(s) 5. Duplicate copies of the same packet can be selectively deleted at the receiving node (e.g., in the UT 7), or at an intermediate network link (such as in the gateways 5). The use of this type of flood routing or modified flood routing provides robustness in that it is less likely that a given packet will be lost, thereby requiring fewer re-transmissions. Furthermore, the overall packet routing algorithm can be reduced in complexity over those techniques that compute a lowest cost or delay path. For example, if each satellite of the constellation 3 automatically forwards a received packet to each neighbor node (satellite and/or gateway), then it can be assumed that the most optimum path has been used.

The overall operation of satellite communication system 1 is such that optimum paths can be established based on the destination router. When there are thousands or millions of host computers to connect to, having lookup tables at every node in the system is not efficient. To solve this problem the known type of DNS (Domain Name System) can be used. The essence of DNS is a hierarchical, domain-based naming scheme. To map a name onto an IP address, an application layer program calls a library procedure known as the resolver, passing to it the name as a parameter. The resolver sends a UDP (User Data Protocol), which supports a connection-less transport layer, that seeks a response without requiring a connection setup. The UDP is sent to a local DNS server, which then looks up the name and returns the IP address to the resolver, which then returns it to the caller. Armed with the IP address, the program can then establish a TCP dialog with the destination, or send it packets. For the purposes of this invention, the user software transmits to the resolver a request to map a name onto an IP address. Alternatively it may send this direct to the satellite where a stored onboard application performs the same function. The resolver in the application software forms a UDP and sends it to the satellite, where it is processed.

There are at least two techniques to perform this processing. A first places the "local" DNS server in the satellite as software executed by the satellite's computer (see FIG. 7), thereby requiring each satellite to store the necessary information in its memory 314. On the other hand, it is possible to store this information on the ground. Two techniques of ground access to the DNS are possible.

Firstly, the gateway router 6 itself can be a DNS server. Secondly, the gateway router 6 may contact a "local" DNS server and act only as a relay. In any of these cases the UDP is processed and the user is provided with the DNS information.

The top-level domains have two types, generic and countries. Generic domains are xxx.com, xxx.edu, etc. Country domains are listed by country, xxx.com.us for the United States, xxx.edu.jp for Japan etc. Each country has its own domain name. With this information the satellite router 4 can make decisions about the "best" satellite or satellites to route the packet to.

Figure 12:
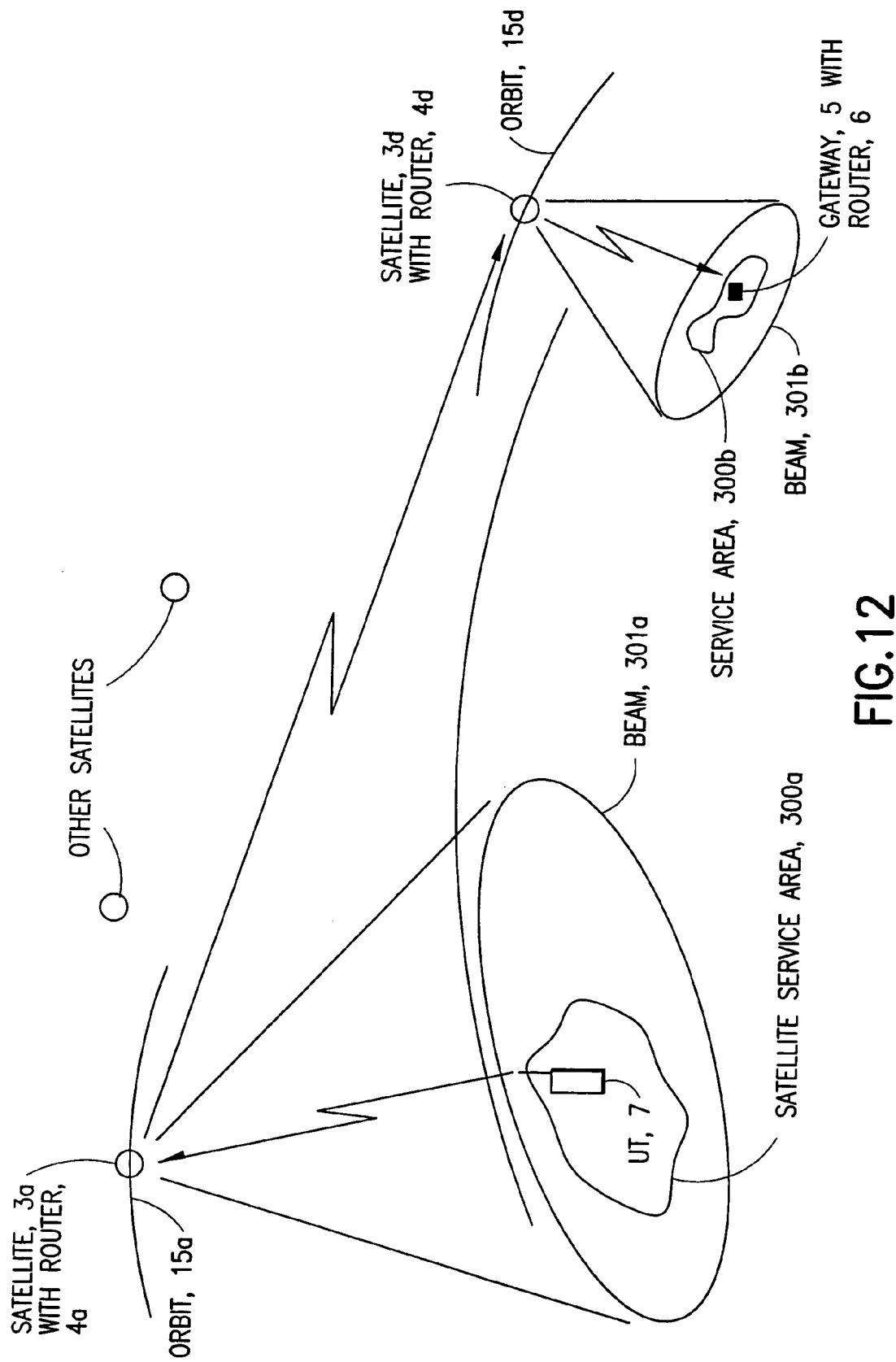
FIG. 12 depicts another example of outbound user terminal to satellite constellation links.

By example, and referring to FIG. 12, the UT 7, after having determined the destination IP address by using DNS, includes this address in each packet sent. Since this address is included in the IP and the TCP header, a next path router can be chosen based on this IP address. Based on the selected algorithm in use at the time the satellite router 4 places the packet on the data stream destined for the best satellite or satellites chosen at that moment in time. The selected next path router(s) may be the router or routers that ultimately send the packet to the ground, via one or more gateways 5, or may be an intermediate step router. FIG. 12 shows the first case, that being the next satellite with a connection or gateway 5.

Consider a UT 7 located in service area 300$a$ (the U.S.A.) that sends a packet encoded with the following destination domain name: cs.keio.ac.jp (e.g. 131.130.70.1) and source IP address (e.g. 146.16.18.223), otherwise known as the user. The satellite 3$a$, upon learning the address of the packet from the destination information, can rapidly determine the destination gateway to the gateway in Japan. Assuming that Japan has a gateway 5 with router 6, the routing algorithm in router 4 of satellite 3$a$ can determine if there is a satellite (or satellites) that its router is in contact with. FIG. 12 shows a condition where satellite 3$a$ has a direct line of sight to satellite 3$d$. Other satellites may be closer to satellite 3$a$, or they may be more heavily loaded. In either case, the serving satellite 3$a$ chooses to put the packet onto a data stream being sent to satellite 3$d$. Satellite 3$d$, upon receiving the packet and passing it to its router 4, determines that it is in contact with the gateway 5 in Japan, and places the packet onto the downlink data stream to the Japanese gateway. The Japanese gateway 5, upon receiving the packet, passes the packet to its router 6 which determines that the packet can be delivered in Japan. The router 6 then forwards the packet onto the Japanese national network where it is processed to cs.keio.ac.jp as any other packet with that destination would be. The server at cs.keio.ac.jp then processes the packet according to its own application layer software. Responses are then formed and after the data is packaged is sent to a packetizing software where the received source address (of the UT 7) becomes the destination address and the cs.keio.ac.jp destination address becomes the source address. The server then sends the packet toward the UT 7, the packet is picked up by the national network and according to the destination (the previous UT 7 source address) determines the entry point to be the Japanese gateway's router 6. The reason this occurs is because it is the "local" IP address for the satellite communication system 1 connected to the national network in Japan. The packet and its header arriving at the gateway router 6 is inspected by the router 6. Depending on the destination location the "best" path to send the packet on is determined by a stored algorithm in the gateway router 6.

There may be some time that elapses between the reception of the user's packet by the gateway 5 and the reception of the responding packet form the destination server. During this time the satellite constellation may move, or change condition with respect to loading, or have some other reason or reasons to cause it to "look different" to the gateway router 6. Therefore, the return path selected for the response to the inbound packet may be quite different than the outbound packet sent from the user.

Figure 13:
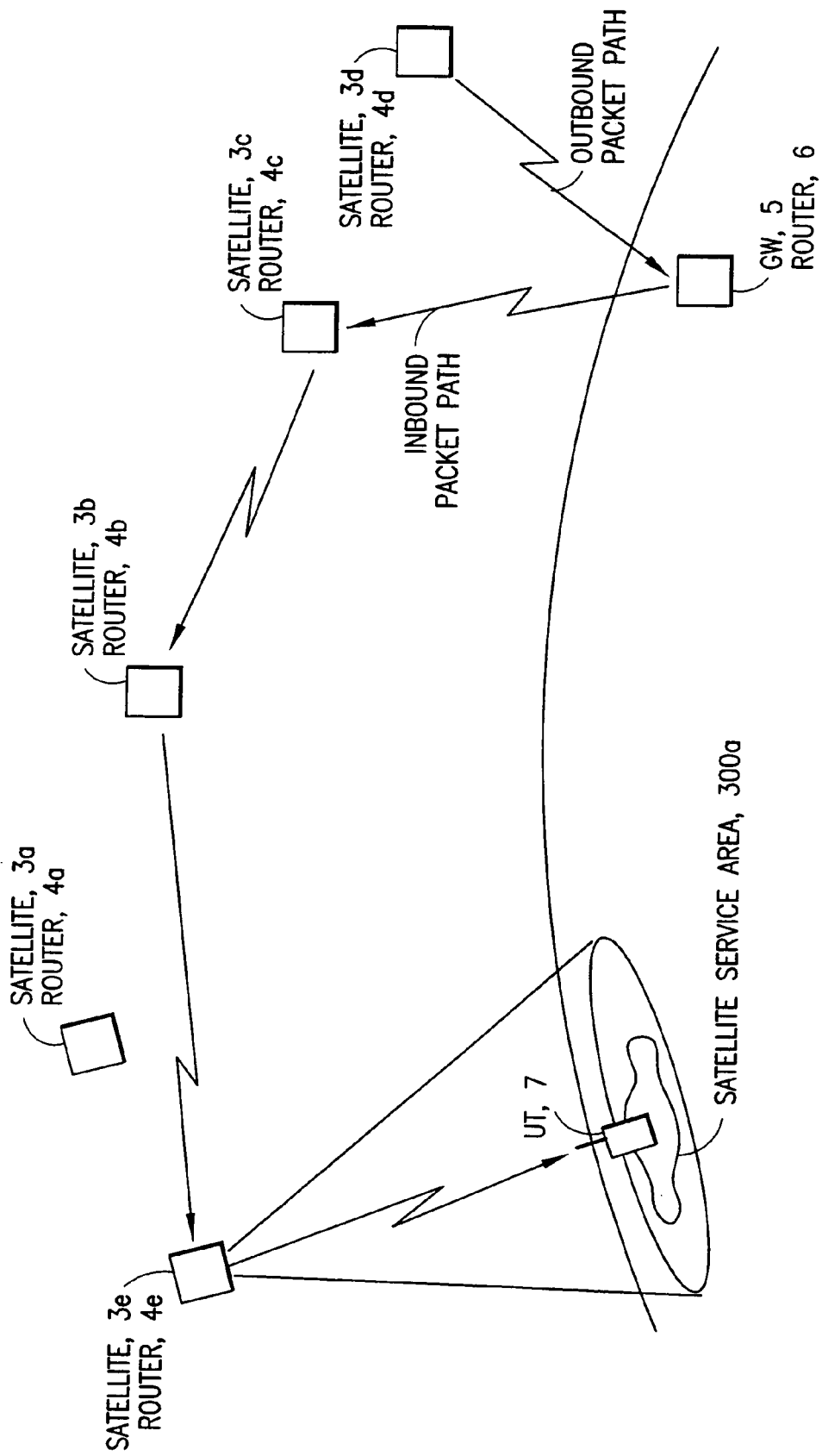
FIG. 13 illustrates an example of return path links through a satellite-based router.

An example of the return path is provided in FIG. 13. While the path shown is extreme, with different satellites handling the return packets, it should be apparent that some, if not all, of the satellites may be the same as those used when the outbound packet is sent from the user 7. The host response packets are sent from the host server 9 to its designated routers. The router either sends the completed packet to another local network router or it injects the packet onto a local or national network. In any case the destination address of the packet will cause the packet to arrive at the router 6 of the nearest local gateway 5. The gateway router 6 then makes a decision about which satellite 3 to send the packet toward. This decision is based on a routing algorithm which optimizes the path as described before. Alternately, two packets can be formed at the gateway router 6 and a redundant packet sent over a different path. In any case, the signal is received by the satellite 3, is demodulated, and is sent to the satellite router 4. In the example of FIG. 13 the signal is sent from gateway 5 to satellite 3C and router 4C. The router 4C receives the packet and detects the destination address. The router 4C can then plan the next satellite 3 to handle the packet, or it may determine to send the packet down to another gateway 5, or to send the packet directly to a user 7. In the example of FIG. 13 the satellite routes 4C determines that the "best" path is to send the packet toward satellite 3B. The satellite router 4B, upon determining the packet address, determines that satellites 3E with router 4E can deliver the packet, and thus routes the packet on a path toward satellite 3E.

With regard to the determination of the location of the user 7, the router 4 in the satellite 3 that will deliver the inbound packet must know where the user 7 is located, e.g., in which beam and if the user is active, in order to deliver the packet. One means of accomplishing this now described.

The position of the user terminal 7 can be located by several means. The position location can be determined by including a GPS receiver in the user terminal 7, and reporting the latitude and longitude of the user terminal 7 to the user terminal software. Alternatively the user terminal 7 can range on several satellite 3 at a time, and using well established techniques, calculate its position and report that position to the software. Finally, if only one satellite is in view, multiple position fixes from the same satellite, which is moving in space, can be used. In any case, the user terminal 7 forms a UDP packet which is destined to one or more satellites, and which contains the user terminal 7 address and physical location. The satellite 3 receives the UDP packet, demodulates the received packet, and detects the information. After processing the satellite 3 adds the user terminal 7 to a list of dynamic on-line user terminals contained in the satellite computer memory 314. The satellite router 4 has access to the user terminal 7 address stored in the satellite memory 314, and a special router can be employed to merge the function of using a dynamic list of on-line users. The satellite router 4 also needs to update other satellite routers of the new user coming on-line, and of the fact that it is the serving router. Each router in turn processes an update message and sends the update message to the other satellite routers 4 that it is in contact with. By this means each satellite router 4 knows which user terminals 7 are on-line.

Next, it is important for the system routers to know how to route packets. The current downlink destination (serving) router address is included with the update to each router 4. In addition to the user terminal 7 address, the serving satellite 3 and router 4 must know in which beam to send the downlink packet. This may, be accomplished by maintaining a grid map in the satellite memory 314 which represents the service area. The grid can be any arbitrary size, such as about 10 km square. The onboard satellite computer, with stored antenna patterns, in conjunction with the position of the user terminal 7, can calculate on an instant by instant the proper beam in which to transmit the inbound packet toward the user terminal 7. The location of each user terminal 7 need be carried only on the serving satellite (or satellites if more than one is selected to serve the user). This means that when a satellite moves away from the user terminal 7 and another begins to cover the area, the new satellite 3 must become aware of the user terminal 7, the location, and the address. Several means of accomplishing this are now disclosed.

One technique provides the serving satellite 3 and router 4 with a stored database of satellite coverage and antenna patterns, and calculates a time appropriate to transfer service control to another satellite. When this time approaches, a UDP message containing the user terminal 7 address and physical location is sent from the serving router 4 to the next serving satellite. The next satellite then updates its database of on-line users to show that it is now the serving satellite, and informs all neighbor routers that the user is now being served by it.

Another possible means of updating the routers does not require a transfer of data between satellites. This approach uses periodic data exchange between the user terminal 7 and the serving satellite(s) 3. In this case, the user terminal 7 forms a UDP message that includes the user terminal address and its physical location. This message is sent at certain intervals, such as every one to two seconds. In this manner, the satellites coverage can overlap, and more than one satellite can serve the user terminal 7. If there are sufficient satellite resources then this method is well suited for use. However, if satellite resources are restricted, it may be important to have only one or a selected set of satellites serve the user terminal. In this case a satellite 3 under control of the onboard computer, based on a stored algorithm and antenna patterns, can determine if it should be the sole server or one of a plurality of servers, and then may either enable or disable the transmit function from the satellite 3 to the user terminal 7.

Figure 14:
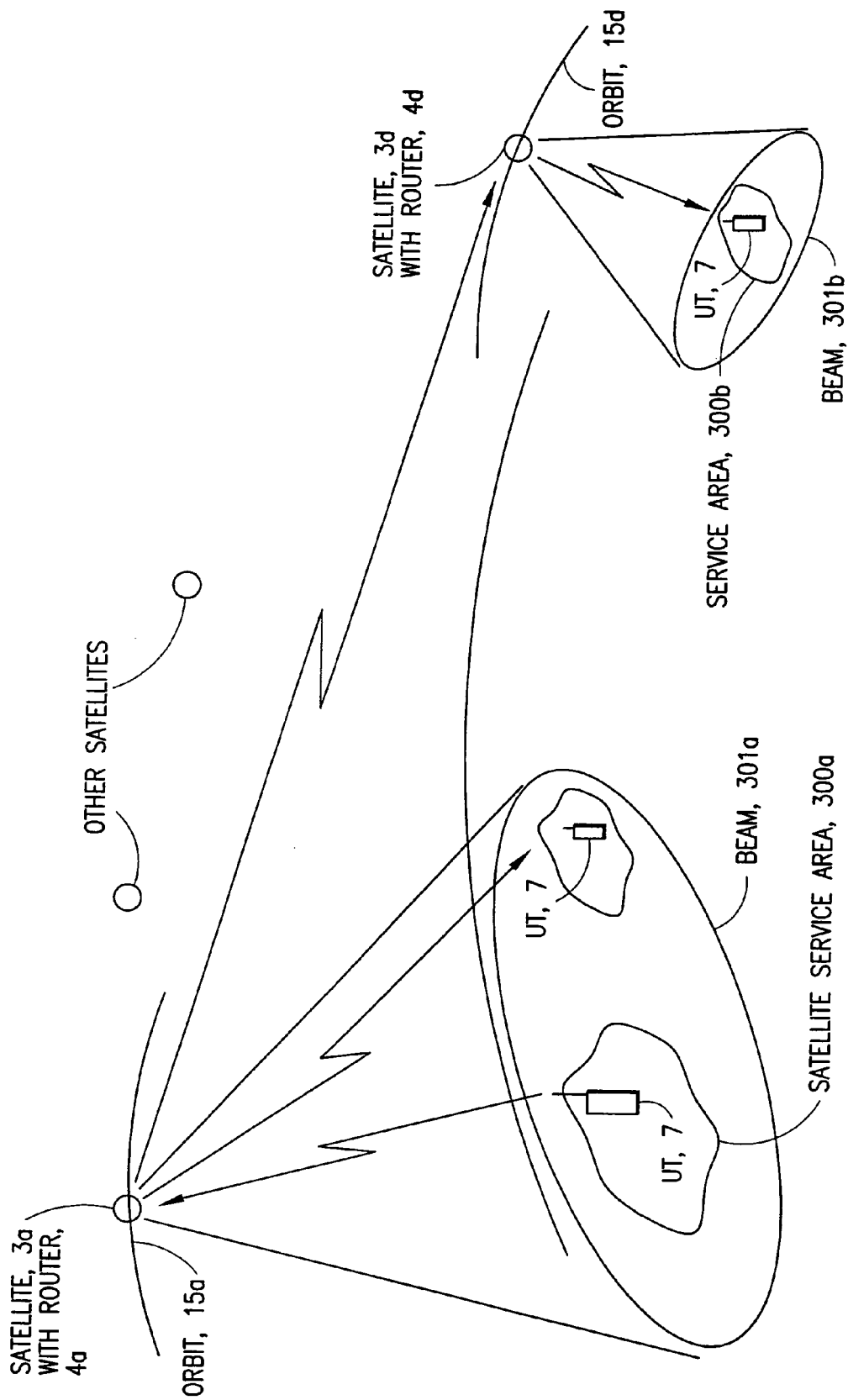
FIG. 14 illustrates an example of user terminal to user terminal communications.

In accordance with an aspect of this invention, one user terminal 7 may send data to and receive data from another user terminal 7 without interventions by the ground infrastructure. In a similar manner to sending a packet to a host computer on another network, (by sending the packets through a gateway 5) a user terminal 7 can send packets directly to another user terminal 7. Referring to FIG. 14, the requesting user terminal 7 performs the following procedure. First, the user terminal 7 sends a UDP message requesting the IP address of the other (destination) user terminal 7. This can be accomplished by having an application layer program call a library routine, known as a resolver, and passing to the resolver the domain name as a parameter. As before, the resolver sends a UDP that supports a connectionless transport layer, that seeks a response without requiring a connection set-up. The UDP is sent to a satellite 3 wherein it checks all stored "local to it" IP addresses of on-line user terminals 7. If this satellite router 4 is not carrying the address, it queries another satellite 3, either directly using an inter-satellite link or through some ground infrastructure, to determine if the IP address is available. If it is not, the satellite 3 flood broadcasts a system wide request for the IP address of the other user terminal 7. If the serving satellite 3 has the IP address it returns the address to router 4 and processes a response message to the user terminal 7 with the IP address that is obtained from the neighboring satellite routers 4, or from more distant satellite routers 4, or from a ground DNS. If the IP address of the destination user terminal 7 is not available, an error message is formed and sent to the originating user terminal 7. After the IP address is found and delivered to the originating user terminal 78, the process proceeds as before, wherein the router 4 in the serving satellite 3 monitors the packets sent to and received from the user terminal 7, and the packets sent to and received from the other user terminal 7. The TCP/IP header fields contain the total length and the header length, therefore the router(s) 4 can collect transmitted data and either transmit it directly to a specific gateway router 6, or they may accumulate some number (N) of packets worth of data and then send summary data toward the specified gateway 5. Billing can then take place by notifying the source, destination, data length (i.e. in bytes) and, if desired, appending a time stamp to the data, and transmitting this data to one (or more) gateways 5 for providing billing information.

Having described the overall functionality and interworking of the various constituent parts of the satellite-based data communications network in accordance with the teachings of this invention, a description will now be made of some variations and enhancements to the system described heretofore.

For example, "Voice over IP" is a relatively new technique of providing voice services by packetizing vocoded voice samples, adding the TCP/IP header to the encoded voice packets, and routing these packets through an IP network to a destination where the voice is decoded and provided to the user. In accordance with an aspect of this invention a user having a computer device, such as a laptop, with proper software and a microphone can provide a non-vocoded data stream or a vocoded data packet stream to the user terminal 7. The user terminal 7 can then voice code (vocode) the signal, if required, and transmit it over the IP network via the one or more satellites 3 and their associated satellite routers 4. The vocoded signal can then be received by a voice gateway 5 connected to the internet, which decodes (performs the opposite of the original vocoder) the signal and applies it to the PSTN. Alternatively, a user terminal 7 (without the associated laptop) can generate and send vocoded user voice packets directly. As can be appreciated, with a voice system the time of arrival of the packets at the destination is important. While it is not necessary that the packets arrive sequentially, it is important that there is low delay, low jitter and a reduced out of sequence rate, etc. To alleviate this problem terrestrial systems are known to employ "tunneling". Tunneling is a means of setting up a semi-permanent path for the duration of a call.

In accordance with an aspect of this invention the tunneling technique is applied for establishing semi-permanent paths through the satellite-based data network, including the satellite (space) segment, as well as in a portion of the terrestrial (ground) segment. Tunneling in this context means two different things.

Bandwidth Reservation: When the voice is transmitted over data packets, the reception of the voice may be of poor quality because of inherent delays and jitter involved in data transmission. This can be avoided by establishing a virtual path between a source and a destination, and reserving bandwidth for this path. The routers on the satellite as well the routers in the gateways take part in the bandwidth reservation. The protocols such as RSVP (Resource Reservation Protocol) can be used for this purpose. Once the virtual path is identified, all the routers in this path are required to reserve the bandwidth for the duration of the call.

Protocol Encapsulation: The voice packets are encapsulated in the IP packets. Once this is done, the satellite routers now need to handle only IP packets. The logical path through which the encapsulated packets travel makes the tunnel. Once the encapsulated voice frames reach their destination, the frames are unencapsulated and forwarded to their destination.

The IP packets containing voice are most likely to pass through the public Internet after they pass through a number of satellites and through a gateway. To provide additional security, the voice packets may be encrypted before they are encapsulated.

In accordance with the teachings of this invention, routers are placed on satellites, and these routers are capable of duplicating packets so that the same IP packets can be directed to at least two different satellites. The UT 7 is also assumed to have this capability. If a UT 7 has an omnidirectional antenna, then a packet sent by the UT 7 will go to multiple number of satellites. These satellites may also duplicate the packet to some number of neighbors. Finally, more than one copy of a given packet will arrive at the destination server. The TCP/IP protocol, however, allows rejection of redundant packets by the server.

It can be realized that in some situations the most efficient policy may not be to always make copies of the packets and distribute the copies to as many neighbors as possible. The extreme is, of course, to never duplicate the packets. While this latter method may prove useful in a loss-less medium, for the lossy medium used for satellite communication the use of this latter technique can be expected to result in substantial numbers of requests for retransmission, thereby significantly reducing the overall packet transmission rate.

Further in accordance with an aspect of this invention the routing algorithm can employ a selective duplication of packets. Whether the satellite router 4, or a UT 7, should send a packet to one neighbor or multiple neighbors (and how many and which neighbors) can be made to depend on one or more of the following exemplary criteria.

(A) A measure of the quality of the transmission medium, such as the Bit Error Rate (BER) of the medium, can be used as a packet duplication criterion. From the Bit Error Rate (BER) of the medium, one can calculate the probability that a packet will be corrupted by the medium. A high bit error rate that can be found in a LEO satellite medium is one motivating factor for generating duplicate packets. As such, the generation of more copies of a packet is justified for the transmissions with high BER. Other transmission medium-quality criteria, such as SNR, Word Error Rate (WER), and Symbol Error Rate (SER), may be used as well, either alone or in combination with the BER.

(B) A determination as to whether the packet been duplicated before can be used as a packet duplication criterion. That is, the number of neighbors a satellite will distribute packets to can be made to be a function of whether a packet that was just received by a given satellite has already been duplicated by any of the previous nodes in the path of the packet. For example, a particular bit can be set in the packet to indicate that the packet is one of a duplicate set packets. If the packet has already been duplicated by a previous node, then there may be less need for duplication of a packet at the present node.

(C) The selective packet duplication decision may also depend on how many hops are required to go from the current satellite to the final destination. For example, if the medium is relatively error free (e.g., exhibits a low BER), then it may not be advantageous to duplicate a particular packet if the next hop is the final destination. However, if there still several hops until the packet's final destination, then it may be better to duplicate the packet, even if the medium is relatively error free. This is true because the probability of bit error is higher during multiple hop propagation of packets than during a single hop propagation.

(D) The decision on whether to duplicate or not may also be made to depend upon the current available bandwidth. If the particular channel is currently not heavily loaded, then packet duplication may be desirable. However, if the channel is currently heavily loaded, then the packet duplication may not be desirable, since it will further load the channel causing more delays and less quality of service for the users.

(E) The system may duplicate packets only for those users who have paid a premium for a guaranteed quality of service. That is, packet duplication may be made a value added feature that is offered to a user. This feature may be one that is always in effect, or may be one that can be selectively turned on or off by a user before beginning a particular packet transmission session.

(F) Further related to selective packet duplication, the system may duplicate packets going in one direction, and not the other. For example, in a file transfer application, the system may duplicate packets from the source to the destination, but the acknowledgments coming back from the destination to the source may not be duplicated. This method of duplication may be preferred in TCP/IP implementations that implement fast retransmit algorithms (see, for example, High Speed Networks—TCP/IP and ATM Design Principle by Stallings.) The Fast Retransmit algorithm interprets duplicate acknowledgements as implying system congestion.

(G) Further related to selective packet duplication, the system may duplicate packets if multicasting is desired, wherein a packet is forwarded to a plurality of selected destinations.

These various criteria can be used by the packet routing algorithm either in isolation or in combination. As but one example, for a case where channel BER is at or near to the threshold where packet duplication begins, the current channel loading may be used as a deciding factor, and vice versa.

The intelligent duplication and distribution of packets made possible by the teachings of this invention can result in reduced numbers of required retransmissions and reduced system delays for all users or for those willing to subscribe to the packet duplication service. The duplication of packets can also reduce the overall complexity of the routing algorithm and its required routing tables and the like. The packet duplication also provides a multicasting capability, wherein a given packet stream can be directed to multiple selected destinations.

While the invention has been particularly shown and described with respect to preferred embodiments thereof, it will be understood by those skilled in the art that changes in form and details may be made therein without departing from the scope and spirit of the invention. By example, it is also within the scope of this invention to wrap larger frames with further destination routers such that not all of the packets have to be decoded and dealt with individually. That is, a set of packets can be sent in a "bundled" fashion through the system 1, and subsequently unbundled and processed individually.

In this invention a stream of data packets originated by a source node is comprised of at least two data packets, which preferably conform to a TCP/IP or equivalent protocol, and which may contain data and/or a digital representation, possibly encrypted, of a user's voice, or more generally a digital representation of any analog input signal, including music. The teachings of this invention may be used to transmit a single packet or a stream of packets from a source to a destination.

The teachings of this invention are also not intended to be limited to any of the specific hardware or software embodiments, routing algorithms or techniques, packet formats, or numbers and types of satellites, modulation schemes and the like that were described above, and all equivalents to the disclosed embodiments are intended to be encompassed as well. Furthermore, the teachings of this invention are not limited for use only in a LEO satellite constellation, as MEO or GEO constellations, or combinations of LEO, MEO and/or GEO constellations can be used as well.

As such, it should be understood that the teachings of this invention are to be accorded a scope that is commensurate with the scope of the appended claims.

What is claimed is:

1. A satellite communication system comprising:
a plurality of satellites and a plurality of gateways,
said satellite communication system being bidirectionally coupled to a terrestrial communication system through said plurality of gateways,
said satellite communication system and said terrestrial communications system comprising together a data communication network having a plurality of nodes including source nodes, destination nodes and intermediate nodes,
wherein multiple copies of a packet are selectively generated within the data communications network based on a criteria that includes at least one of (a) whether the packet was previously duplicated by a previous node, and (b) a direction of transmission, from source to destination or from destination to source,
wherein said multiple copies of a packet coexist within the data communications network and are routed, using at least in part satellite-resident routers and gateway-resident routers, over a plurality of different paths between a particular source node and a particular destination node, and
wherein at least one duplicate copy of a given packet is not used during the execution of a packet reordering procedure in the destination node, or at an intermediate node.

2. A system and network as in claim 1, wherein certain of said paths are carried over satellite-to-satellite cross-links.

3. A system and network as in claim 1, wherein certain of said paths are carried over satellite-to-gateway uplinks and downlinks.

4. A system and network as in claim 1, wherein at least one of said paths is carried over a satellite-to-user terminal uplink and downlink.

5. A system and network as in claim 1, wherein said packets are TCP/IP packets (or packets with equivalent protocol) containing information for enabling said duplicate packets to be ignored.

6. A system and network as in claim 1, wherein said plurality of gateways couple said satellite communication system to said terrestrial communication system at a plurality of points, including at least at one of regional networks, national networks, commercial networks, Internet Service Providers (ISPs), or directly to a backbone network.

7. A system and network as in claim 1, wherein said plurality of satellites comprise a constellation of non-geosynchronous orbit satellites.

8. A system and network as in claim 1, wherein said plurality of satellites comprise a constellation of low earth orbit satellites.

9. A system and network as in claim 1, wherein said plurality of satellites comprise a constellation of medium earth orbit satellites.

10. A system and network as in claim 1, wherein said packets are TCP/IP or equivalent packets.

11. A system and network as in claim 1, wherein at least some of said packets comprise voice data.

12. A system and network as in claim 11, wherein said system routes said packets comprised of voice data over semi-permanent paths that are established during the duration of a call.

13. A system and network as in claim 11, wherein said at least some of said packets that comprise voice data comprise vocoded voice data that is generated external to a user terminal and that is input to the user terminal for transmission to at least one satellite.

14. A system and network as in claim 11, wherein said at least some of said packets that comprise voice data comprise vocoded voice data that is generated internal to a user terminal for transmission to at least one satellite.

15. A system and network as in claim 1, wherein said duplicate packets are transmitted from a plurality of satellite-resident routers to a single gateway-resident router, and are injected into the Internet by the single gateway-resident router.

16. A system and network as in claim 1, wherein said duplicate packets are transmitted from a plurality of satellite-resident routers to a plurality of gateway-resident routers, and are injected into the Internet by each of the plurality of gateway-resident routers.

17. A satellite communication system comprising:
a plurality of satellites and a plurality of gateways,
said satellite communication system being bidirectionally coupled to a terrestrial communication system through at least said plurality of gateways,
said satellite communication system and said terrestrial communications system comprising together a data communication network having a plurality of nodes including source nodes, destination nodes and intermediate nodes,
wherein multiple copies of a packet are selectively generated within the data communications network based on a criteria that includes at least one of (a) whether the packet was previously duplicated by a previous node, and (b) a direction of transmission, from source to destination or from destination to source, and
wherein the multiple copies of the packet are routed, using at least in part satellite-resident routers and gateway-resident routers, over a plurality of different paths between a particular source node and a particular destination node, and
wherein at least one of the multiple copies of a packet is not used during the execution of a packet reordering procedure in the destination node, or at an intermediate node.

18. A system and network as in claim 17, wherein certain of said paths are carried over satellite-to-gateway uplinks and downlinks, and certain other paths are carried over satellite-to-satellite cross-links.

19. A system and network as in claim 17, wherein at least one of said paths is carried over a satellite-to-user terminal uplink and downlink.

20. A system and network as in claim 17, wherein said packets are TCP/IP packets (or packets with equivalent protocol) containing information for enabling said duplicate packets to be ignored.

21. A system and network as in claim 17, wherein said plurality of gateways couple said satellite communication system to said terrestrial communication system at a plurality of points, including at least at one of regional networks, national networks, commercial networks, Internet Service Providers (ISPs), or directly to a backbone network.

22. A system and network as in claim 17, wherein said plurality of satellites comprise a constellation of non-geosynchronous orbit satellites.

23. A system and network as in claim 17, wherein said plurality of satellites comprise a constellation of low earth orbit satellites.

24. A system and network as in claim 17, wherein said plurality of satellites comprise a constellation of medium earth orbit satellites.

25. A system and network as in claim 17, wherein individual ones of said packets conform to TCP/IP or an equivalent protocol.

26. A system and network as in claim 17, wherein at least some of said packets comprise voice data.

27. A system and network as in claim 26, wherein said system routes said packets comprised of voice data over semi-permanent paths that are established during the duration of a call.

28. A system and network as in claim 26, wherein said at least some of said packets that comprise voice data comprise encrypted voice data.

29. A system and network as in claim 17, wherein said multiple copies of a packet are transmitted from a plurality of satellite-resident routers to a single gateway-resident router, and are injected into the Internet by the single gateway-resident router.

30. A system and network as in claim 17, wherein said multiple copies of a packet are transmitted from a plurality of satellite-resident routers to a plurality of gateway-resident routers, and are injected into the Internet by each of the plurality of gateway-resident routers.

31. A method for packet data transmission through a data communications system comprising satellite routers and terrestrial routers, comprising steps of:
originating a stream of packets at a source node;
selectively duplicating individual ones of the stream of packets within the data communications network based on a criteria that includes at least one of (a) whether the packet was previously duplicated by a previous node, and (b) a direction of transmission, from source to destination or from destination to source;
operating said satellite routers to route duplicate packets over different paths, including wireless paths through a medium subject to transmission impairments; and
reconstructing the stream of packets from received packets while ignoring an arrival of an already received and valid packet.

* * * * *